US007891815B2

(12) United States Patent
Nayar et al.

(10) Patent No.: US 7,891,815 B2
(45) Date of Patent: Feb. 22, 2011

(54) SYSTEMS AND METHODS FOR DISPLAYING THREE-DIMENSIONAL IMAGES

(75) Inventors: Shree K Nayar, New York, NY (US); Vijay Anand Nagarajan, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 12/569,684

(22) Filed: Sep. 29, 2009

(65) Prior Publication Data

US 2010/0157030 A1    Jun. 24, 2010

Related U.S. Application Data

(63) Continuation of application No. 11/666,228, filed as application No. PCT/US2005/038321 on Oct. 25, 2005, now Pat. No. 7,614,748.

(60) Provisional application No. 60/621,837, filed on Oct. 25, 2004, provisional application No. 60/651,740, filed on Feb. 10, 2005, provisional application No. 60/726,301, filed on Oct. 12, 2005.

(51) Int. Cl.
  *G03B 21/14* (2006.01)
(52) U.S. Cl. ................ 353/7; 219/121.69; 359/466; 33/28
(58) Field of Classification Search .............. 353/7, 353/10, 94, 98, 99, 28; 359/462–467, 458, 359/471, 475, 477; 219/121.69
See application file for complete search history.

(56) References Cited

U.S. PATENT DOCUMENTS

| | | | | |
|---|---|---|---|---|
| 3,603,668 A | * | 9/1971 | DeBitetto | 359/574 |
| 3,609,706 A | * | 9/1971 | Adamson | 365/119 |
| 4,092,518 A | * | 5/1978 | Merard | 219/121.69 |
| 4,508,420 A | * | 4/1985 | Nishiwaki | 359/3 |
| 4,799,739 A | * | 1/1989 | Newswanger | 359/15 |
| 4,874,213 A | * | 10/1989 | Cowan | 359/10 |
| 4,878,735 A | * | 11/1989 | Vilums | 359/462 |
| 4,890,902 A | * | 1/1990 | Doane et al. | 349/94 |
| 5,032,003 A | * | 7/1991 | Antes | 359/567 |
| 5,106,174 A | * | 4/1992 | Smith | 359/19 |
| 5,347,644 A | * | 9/1994 | Sedlmayr | 359/465 |
| 5,410,345 A | * | 4/1995 | Eichenlaub | 348/59 |
| 5,465,175 A | * | 11/1995 | Woodgate et al. | 359/463 |
| 5,575,936 A | * | 11/1996 | Goldfarb | 219/121.68 |
| 5,760,933 A | * | 6/1998 | Aritake et al. | 359/22 |
| 5,763,519 A | * | 6/1998 | Springsteen | 524/403 |
| 5,764,317 A | * | 6/1998 | Sadovnik et al. | 349/5 |
| 5,813,742 A | * | 9/1998 | Gold et al. | 353/88 |

(Continued)

*Primary Examiner*—William C Dowling
(74) *Attorney, Agent, or Firm*—Byrne Poh LLP

(57) ABSTRACT

Systems and methods for displaying three-dimensional (3D) images are described. In particular, the systems can include a display block made from a transparent material with optical elements three-dimensionally disposed therein. Each optical element becomes luminous when illuminated by a light ray. The systems can also include a computing device configured to generate two-dimensional (2D) images formatted to create 3D images when projected on the display block, by a video projector coupled to the computing device. The video projector is configured to project the 2D images on the block to create the 3D images by causing a set of the passive optical elements to become luminous. Various other systems and methods are described for displaying 3D images.

20 Claims, 48 Drawing Sheets

U.S. PATENT DOCUMENTS

| | | | | |
|---|---|---|---|---|
| 5,831,765 A * | 11/1998 | Nakayama et al. | ........... | 359/464 |
| 5,959,704 A * | 9/1999 | Suzuki et al. | ................... | 349/9 |
| 5,990,990 A * | 11/1999 | Crabtree | ...................... | 349/74 |
| 6,064,423 A * | 5/2000 | Geng | ........................... | 348/36 |
| 6,064,521 A * | 5/2000 | Burke | ......................... | 359/443 |
| 6,087,617 A * | 7/2000 | Troitski et al. | ........... | 219/121.6 |
| 6,195,184 B1 * | 2/2001 | Chao et al. | ..................... | 359/32 |
| 6,219,184 B1 * | 4/2001 | Nagatani | .................... | 359/472 |
| 6,293,898 B1 * | 9/2001 | Yang | ........................... | 359/22 |
| 6,417,485 B1 * | 7/2002 | Troitski | ................. | 219/121.69 |
| 6,441,930 B1 * | 8/2002 | Hart | ............................ | 359/35 |
| 6,466,184 B1 * | 10/2002 | Whitesell et al. | ............... | 345/6 |
| 6,466,185 B2 * | 10/2002 | Sullivan et al. | .................. | 345/6 |
| 6,509,548 B1 * | 1/2003 | Troitski | ................. | 219/121.69 |
| 6,525,847 B2 * | 2/2003 | Popovich et al. | .............. | 359/15 |
| 6,535,674 B2 * | 3/2003 | Veligdan | ..................... | 385/120 |
| 6,537,479 B1 * | 3/2003 | Colea | ......................... | 264/400 |
| 6,596,967 B2 * | 7/2003 | Miesak | .................. | 219/121.69 |
| 6,605,797 B1 * | 8/2003 | Troitski | ................. | 219/121.69 |
| 6,630,644 B2 * | 10/2003 | Troitski et al. | ......... | 219/121.69 |
| 6,646,623 B1 * | 11/2003 | Chakrabarti | .................... | 345/6 |
| 6,664,501 B1 * | 12/2003 | Troitski | ................. | 219/121.69 |
| 6,665,100 B1 * | 12/2003 | Klug et al. | ..................... | 359/23 |
| 6,697,042 B1 * | 2/2004 | Cohen et al. | ................. | 345/102 |
| 6,707,518 B1 * | 3/2004 | Cowan | ....................... | 349/113 |
| 6,721,023 B1 * | 4/2004 | Weiss et al. | .................... | 349/87 |
| 6,727,460 B2 * | 4/2004 | Troitski | ................. | 219/121.68 |
| 6,740,846 B1 * | 5/2004 | Troitski et al. | ......... | 219/121.69 |
| 6,768,080 B2 * | 7/2004 | Troitski | ................. | 219/121.69 |
| 6,777,104 B2 * | 8/2004 | Colea | ...................... | 428/542.2 |
| 6,801,354 B1 * | 10/2004 | Payne et al. | ................. | 359/291 |
| 7,060,933 B2 * | 6/2006 | Burrowes et al. | ....... | 219/121.69 |
| 2002/0008674 A1 * | 1/2002 | Son et al. | ........................ | 345/4 |
| 2003/0011884 A1 * | 1/2003 | Van Berkel | ................. | 359/464 |
| 2003/0107805 A1 * | 6/2003 | Street | ......................... | 359/464 |
| 2007/0081207 A1 * | 4/2007 | Bimber | ........................... | 359/9 |

* cited by examiner

FIG. 5

SYSTEMS AND METHODS FOR DISPLAYING THREE-DIMENSIONAL IMAGES

RELATED APPLICATIONS

This application is a continuation of U.S. patent application Ser. No. 11/666,228, filed on Apr. 7, 2008, which is the U.S. National Phase application of International Application No. PCT/US2005/038321, filed on Oct. 25, 2005, which claims the benefit of U.S. Provisional Patent Application No. 60/621,837, filed on Oct. 25, 2004, U.S. Provisional Patent Application No. 60/651,740, filed on Feb. 10, 2005, and U.S. Provisional Patent Application No. 60/726,301, filed on Oct. 12, 2005, which are hereby incorporated by reference herein in their entireties.

FIELD OF THE INVENTION

The present invention relates to systems and methods for displaying three-dimensional (3D) images. More particularly, the present invention relates to systems and methods for displaying 3D images using passive optical elements in a display block. The present invention also relates to systems and methods for displaying 3D images using anamorphic light engines and/or reflective elements having curved surfaces.

BACKGROUND OF THE INVENTION

Systems for displaying images (for both static and video images) have become a ubiquitous part of our everyday lives. For example, televisions provide viewers with news and entertainment. Display monitors used in computers and cellular phones enable users to interact with a variety of devices and various forms of information via images displayed on the monitors. High quality digital display systems have also emerged as possible replacements for physical media such as photographs and paintings. Recently, home theater systems with large projection display systems allow viewers to enjoy theater-like experience in their homes.

Despite the advancement of technologies relating to display systems, most conventional display systems only display two-dimensional (2D) images. A viewer, however, perceives the world in three dimensions by perceiving depth in addition to the horizontal and vertical dimensions. Because 2D images do not contain depth information, they appear to be less realistic to a viewer. A system that can display static or dynamic 3D images in high resolution is therefore desirable over 2D display systems. Moreover, in some situations, it is also desirable that a 3D display system simultaneously provide different perspectives of a 3D scene to viewers who are located at different angles with respect to the 3D scene. Such a system also allows a viewer to move around the 3D scene and gain different perspectives of the scene.

Several approaches have been used or proposed to display 3D images. One approach is to project two different images on one screen. The two different images contain the same scene captured from two different angles. A viewer is required to wears glasses that separate the combined image into the two different images. In particular, the glasses cause each eye of the viewer to perceive one of the two different images. This separation is possible because each image uses a distinct color (e.g., red and blue) or polarization. However, this approach suffers from the drawback that viewers must wear glasses in order to have a 3D experience.

A second conventional approach is to combine multiple 2D images of a scene, captured from different angles, into a single 2D image. In this approach, a set of adjacent pixels in the combined 2D image plays the role of a single pixel. Each pixel in the set of pixels corresponds to the same point in a scene, but has different brightness and color corresponding to a different perspective. A pinhole or a slit is placed at some distance from the set of pixels. For each point in the scene to be displayed, the pinhole or slit passes different color and brightness in different angles. Therefore, the eyes of a viewer perceive images that correspond to two different perspectives of a 3D scene. As a viewer moves around, the viewer also obtains different perspectives of the 3D scene being displayed. Instead of a pinhole or a slit, sometimes a lens is used. However, this approach suffers from the drawback that spatial resolution is significantly reduced.

A third conventional approach is to trade-off brightness resolution for generating the needed directional variation in displayed colors or brightness. In this approach, a screen is rotated at a very high speed. The rotating screen covers a 3D region of space. Each point in the 3D region is illuminated only when the screen passes through that point. The screen completes at least one full rotation during the time the eye integrates a single image. Therefore, the two eyes perceive images that correspond to two different perspectives of a 3D scene. In this case, an enormous amount of light energy is needed for the scene to appear crisp and bright. In addition, it requires the continuous mechanical movement of an entire projection system. As a result, it is difficult to scale such an approach to cover reasonably large display spaces. Finally, this approach is limited because it does not adequately handle points that are hidden from the viewer. Because one does not know a priori where the viewer is located, all points in the 3D scene are lit. Hence, the points that should be hidden can be seen "through" other visible points.

Yet another conventional approach is to use a display block formed by a set of liquid crystal sheets stacked together. The cells of the sheets are of the "scattering" type. A high frame rate projector is used to illuminate the stack of sheets where each projected frame is scattered by a single liquid crystal sheet while the remaining sheets are fully transparent and hence let light pass through to the viewer. Because the integration time of the eye is greater than the time it takes to illuminate all the sheets, the viewer perceives a volume that is lit up at the appropriate locations. This approach also suffers from the drawback that an enormous amount of light energy is required to create a bright 3D scene. In addition, points that should be hidden are always visible to the viewer.

In other conventional volumetric display systems, the display blocks are made of materials that can locally respond to specific types of illumination. In one example, fluorescent materials are used that glow when illuminated with laser beams shone from multiple directions. Such displays do not create a four-dimensional light field because the directional radiance of each point cannot be controlled. As a result, the displayed image is a collection of translucent (ghost-like) glowing points of light that are visible from all directions. Finally, holographic methods have been suggested several times in the past as a possible alternative. Unfortunately, conventional holographic displays can only display low quality images.

SUMMARY OF THE INVENTION

Various embodiments of the present invention provide 3D display systems and methods that overcome various shortcomings discussed above. For instance, the 3D display systems of various of embodiments of the present invention do not require the use of specialized glasses or a large amount of light power. Moreover, the 3D display systems of various of embodiments of the present invention can provide different perspectives of a displayed 3D scene to viewers located at different viewing angles and/or not show points that should be hidden from viewers.

These and other advantages of various embodiments of the present invention are provided by using, among other things, a display device that includes a display block made from a transparent material and passive optical elements. The passive optical elements are three-dimensionally disposed within the display block. Each optical element becomes luminous when illuminated by a light ray. The display block can be a solid three-dimensional block with passive optical elements that are localized damages produced by an etching process. Alternatively, the display block can be stacked layers with the passive optical elements embedded between the stacked layers. Here, the passive optical elements can be Lambertian reflectors. The passive optical elements can form a 3D grid with regular or irregular patterns. Alternatively, the passive optical elements can form a 3D object. An example of the 3D object is a mask of a human face. Various embodiments of the present invention may also include a computing device configured to generate 2D images formatted to create 3D images when projected on the display block, and a video projector coupled to the computing device. The projector is configured to project the 2D images on the block to create the 3D images by causing a set of the passive optical elements to become luminous.

Embodiments of the present invention also provide various methods to display 3D images. An example method may include the step of generating 2D images formatted to create 3D images when projected on a display block made from transparent material with three-dimensionally disposed passive optical elements. Here, each passive optical element becomes luminous when illuminated by a light ray. The example method may also include the step of projecting the 2D images on the block to create the 3D images by causing a set of the passive optical elements to become luminous.

Various embodiments of the present invention provide another system for displaying 3D images. The system includes an array of reflective spheres, a camera having a focal point, and a projector having a projection center. The system also includes a beam splitter interposed between the camera and the projector such that the focal point of the camera is co-located with the projection center of the projector with respect to the array of reflective spheres.

Various embodiments of the present invention further provide yet another system for displaying 3D images. The system includes an array of video projectors. Each of the video projectors includes an anamorphic lens configured to compress images in one direction. The system also includes a diffusive screen to project images from the array of video projectors, and a set of lenticular lenses disposed near the diffusive screen, to thereby create 3D images from the compressed images when perceived by a viewer.

BRIEF DESCRIPTION OF THE DRAWINGS

The Detailed Description including the description of various embodiments of the invention will be best understood when read in reference to the accompanying figures wherein:

FIG. 5 is a diagram illustrating a relationship between passive optical elements and projector pixels in an example of a volumetric display system according to various embodiments of the present invention;

DETAILED DESCRIPTION OF THE INVENTION

Volumetric Display Systems Using Passive Optical Elements

According to various embodiments of the present invention, a system for displaying 3D images can include a display block containing passive optical elements. In some embodiments, a display block may be formed from a solid block of transparent glass or plastic. Within this block, optical elements may be etched using a well-known technique called laser-induced damage (LID), where the elements are etched within the material by using a pulsed laser beam that is periodically focused at the locations of the elements. This technique of etching is well known in the art and is typically used to create static 3D images within glass and plastic blocks. Each etched element scatters light (and hence glows) when a ray of light illuminates it. Alternatively, a display block may be formed by stacking sheets of a transparent material together with optical elements embedded between the sheets. These sheets may be spaced using any suitable technique.

Figure 1:
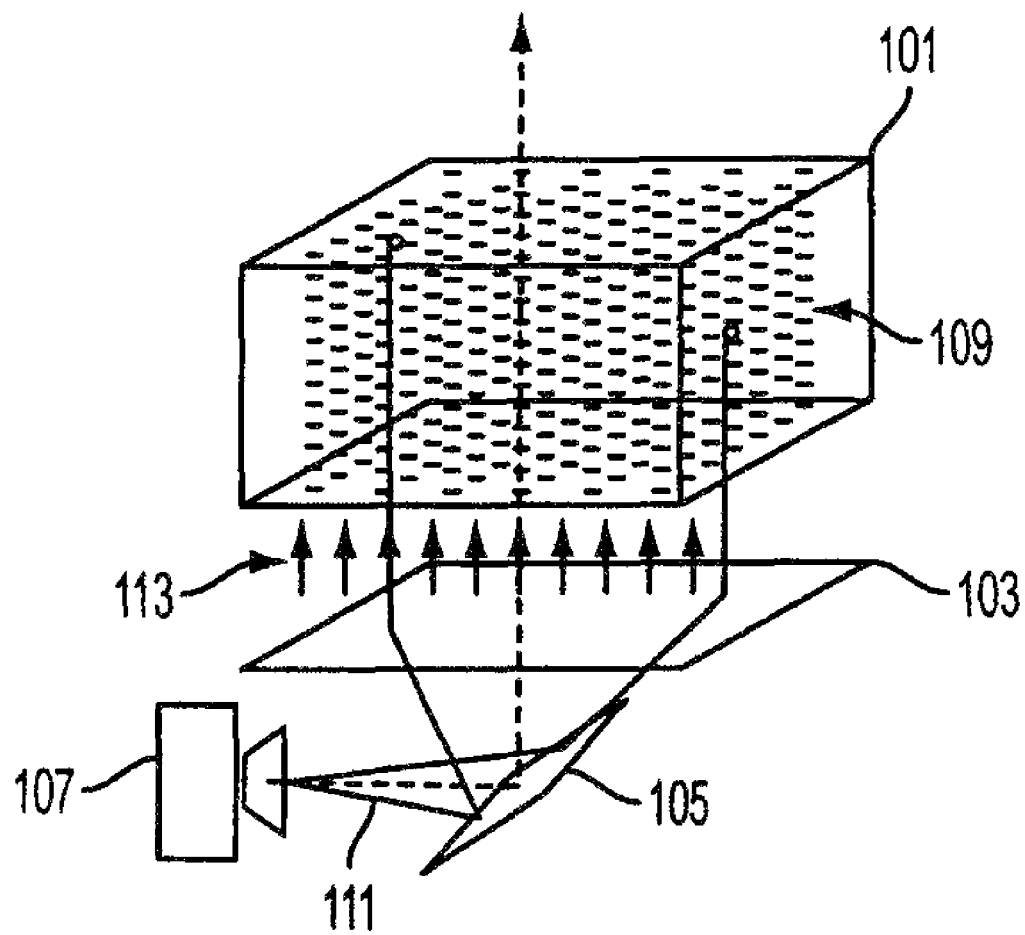
FIG. 1 is a perspective view illustrating a volumetric display system using passive optical elements according to various embodiments of the present invention.

FIG. 1 illustrates an example of a volumetric display system using passive optical elements. As shown, the system includes a display block 101 (which may be a glass block, for example from Lazart Inc.), a lens 103 for creating parallel illumination rays (for example, a Fresnel lens, Model #37, manufactured by Fresnel Technologies, Inc.), a flat redirection minor 105 for folding the light rays to enable smaller packaging, and a video projector 107 (for example, Model U5-232, manufactured by Plus Vision Corporation). The display block 101 contains a group of optical elements 109 (for example, etched in a glass block using LID).

In operation, the redirection minor 105 redirects the image produced by the video projector 107 in the direction of the Fresnel lens 103. The Fresnel lens 103 then converts the diverging set of rays 111 from the video projector 107 into a parallel set of rays 113. These parallel rays 113 are focused close to or within the display block 101, causing the elements 109 within the display block 101 to become luminous.

As generally illustrated, the elements 109 are arranged in a 3D grid of points as described below. Although the term "grid" is used herein, it should be apparent to one of ordinary skill in the art the elements may be positioned at any suitable locations within the grid as described herein and need not be located with any regular spacing.

Because a video projector 107 may be used, the illumination of elements 109 generated by the video projector 107 can be changed at the frame rate of the projector 107. Therefore, this system can be used to produce dynamic, color 3D images within the display block 101. For example, still images and moving video may be created in the display block 101. In some embodiments, the video projector 107 may be controlled using a suitable video signal source such as a computer, a DVD player, etc.

Figure 2:
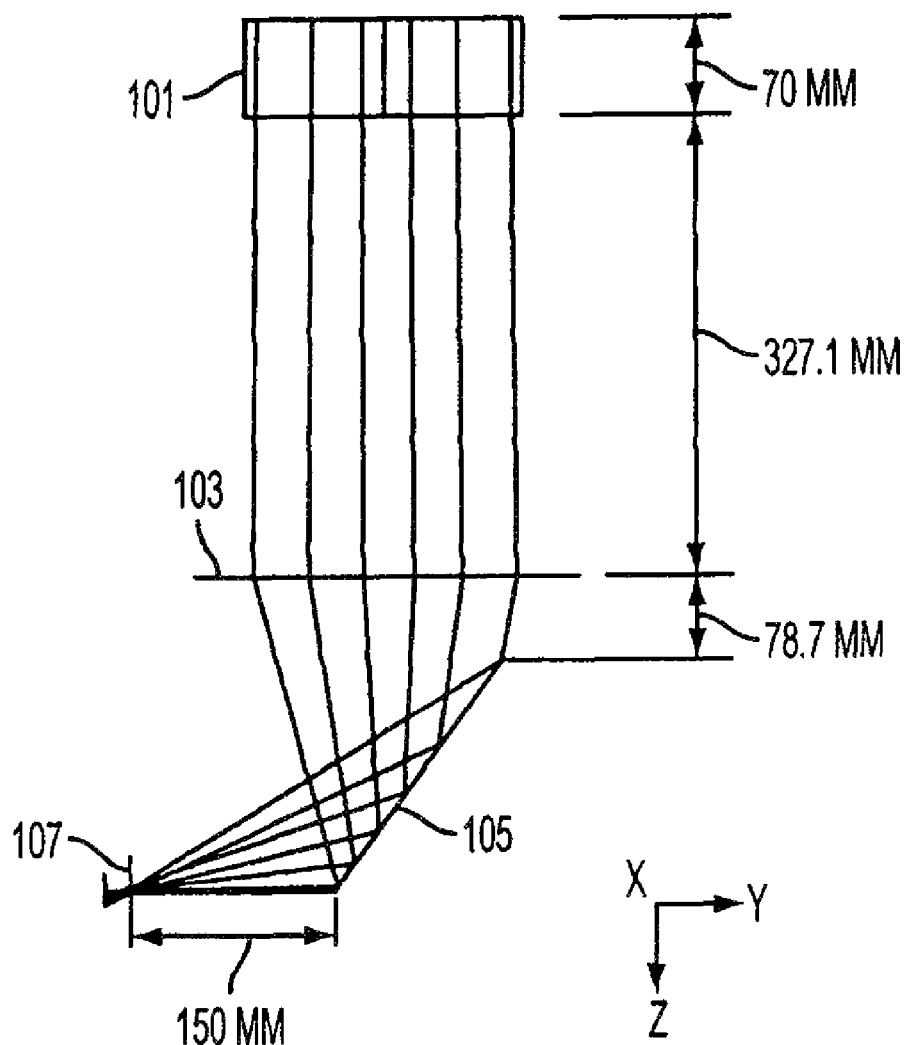
FIG. 2 is a cross-sectional view of a volumetric display system illustrated in FIG. 1.

FIG. 2 is a cross-sectional view illustrating an example of a possible optical layout of the system illustrated in FIG. 1. In this layout, the Fresnel lens 103 can be tilted 14.85 degrees relative to the optical axis of the projector 107. The redirection mirror 105 can be tilted 37.575 degrees relative to the vertical axis of the figure. It may be necessary to adjust the position of the redirection mirror 105 during assembly of the system by rotating the redirection mirror around the horizontal axis of the figure that is perpendicular to the figure's plane. The clear aperture of the redirection mirror 105 may have dimensions of 200 mm×200 mm, which is the same as the horizontal cross section of the display block 101, as well as the dimension of the Fresnel lens 103. Several millimeters can be added to the mirror dimensions for mirror mounting. Therefore, the overall size of the redirection mirror can be 210 mm×210 mm. Projector 107 can have an objective focus of 18.4 millimeters. The relative position of various components of the system is also shown in this figure.

Figure 3:
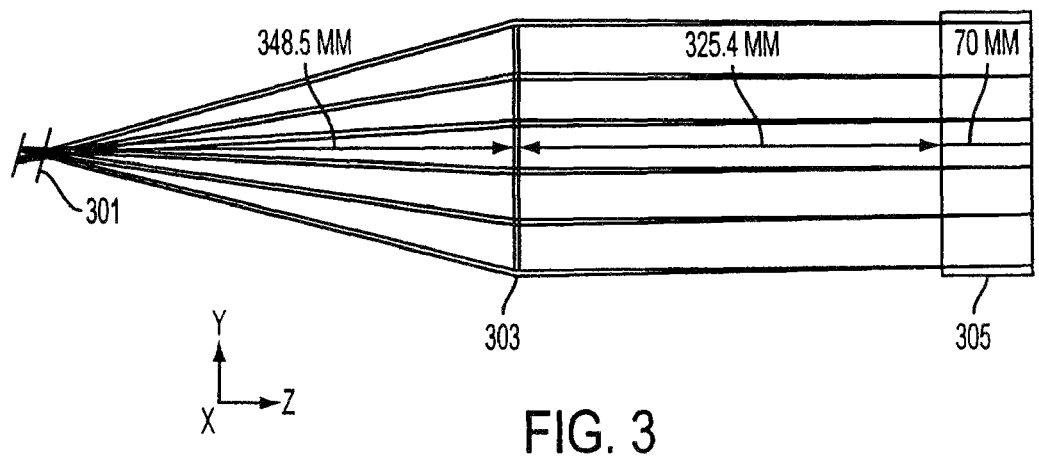
FIG. 3 a cross-sectional view of another volumetric display system according to various embodiments of the present invention.

FIG. 3 illustrates another example of a possible layout of a volumetric display system. Unlike the volumetric display system illustrated in FIGS. 1 and 2, this system does not include a redirection mirror. The video projector 301, the Fresnel lens 303, and the display block 305 can be of the same models as in FIG. 1. The Fresnel lens 303 may have dimensions 267×267 millimeters and a focus of 360 millimeters. Projector 301 can have an objective focus of 18.4 millimeters. The relative position of various components of the system is also shown in this figure.

Systems With Regularly Spaced Passive Optical Elements

Figure 4:
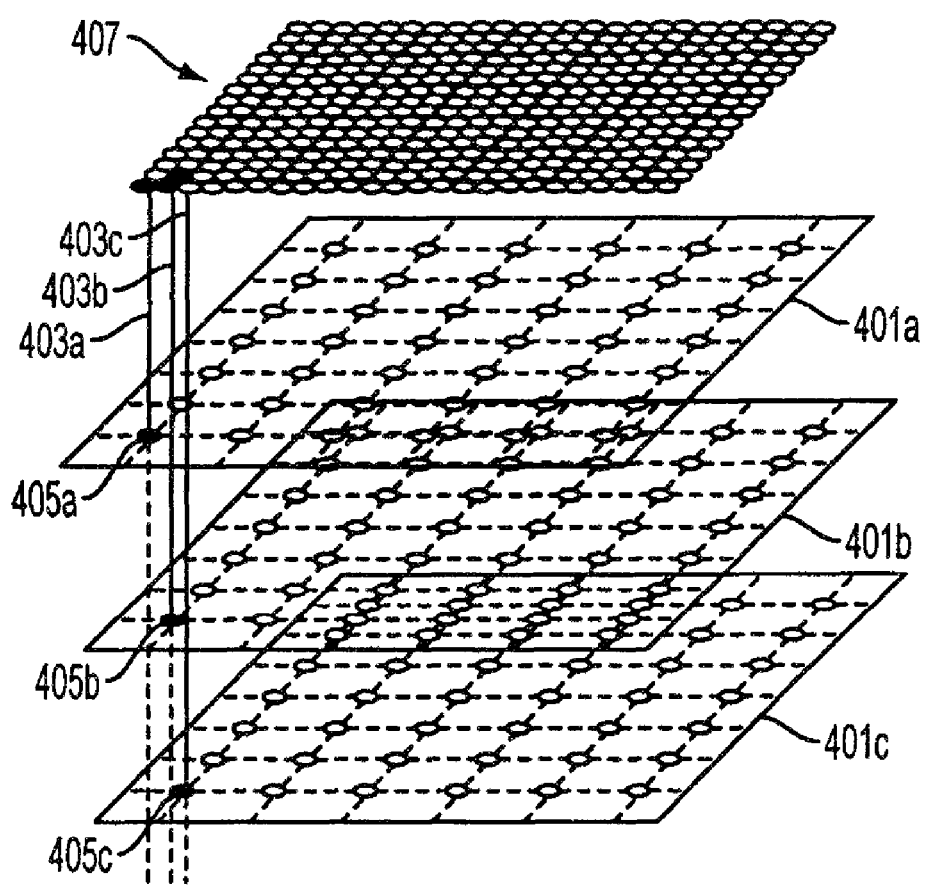
FIG. 4 is a diagram illustrating an example of a volumetric display system according to various embodiments of the present invention.

FIG. 4 is a diagram illustrating an example of a volumetric display system. In this example, passive optical elements lie on parallel layers. The figure shows three layers 401a, 401b, and 401c of optical elements as a portion of a display block. Also included in the figure is a portion of a light engine, represented by a group of light engine pixels 407 illuminating the corresponding optical elements. A light engine, as used in this context, is an apparatus that produces light rays for displaying images. A light engine pixel, as used in this context, is a unit element in a light engine that is capable of producing a distinct light ray (i.e., a light ray of a unique color and brightness independent of other light rays). Within each layer, the optical elements are equally spaced so that they form a regular pattern. As shown, the layers 401a, 401b, and 401c may be positioned with equal distance between neighboring layers. The patterns of optical elements in the different layers are offset with respect to each other so that parallel light rays from projector light source 407 can be directed at the optical elements without interference from the optical elements of the other layers. For example, parallel light rays 403a, 403b and 403c are directed at optical elements 405a, 405b and 405c respectively without interference from other optical elements, because the horizontal coordinates of the optical elements 405a, 405b and 405c are different from each other. In this example, the resolution of the light engine 407 is high enough so that each optical element can be illuminated by a distinct light ray. Therefore, each optical element can display a color and brightness independent of other optical elements.

Figure 5:
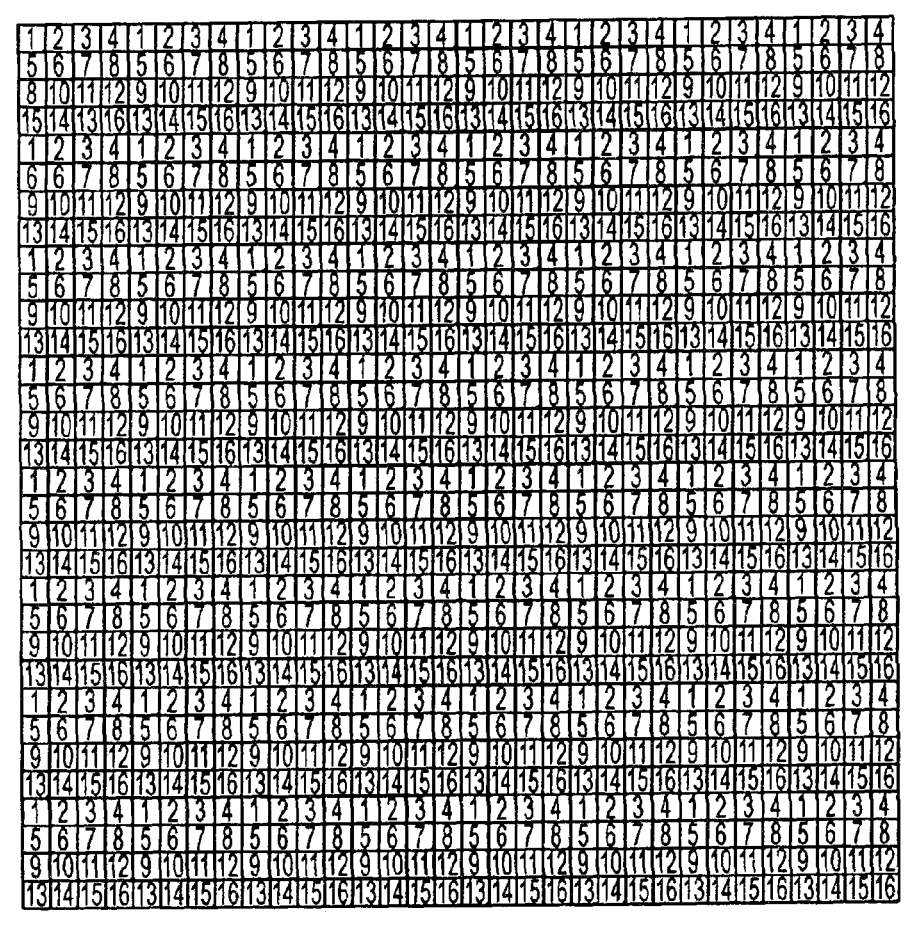

FIG. 5 is a diagram showing a possible layout of light engine pixels. The diagram further illustrates the relationship between the optical elements and the light engine pixels in a volumetric display system generally illustrated in FIG. 4. Each small square containing a number represents a pixel. As shown, the 32×32 light engine pixels can be divided into 8×8 tiles, each tile having 4×4 light engine pixels. The 16 light engine pixels in any given tile can correspond to 16 optical elements that lie on different layers, with the numbers associated with each pixel (from 1 to 16) denoting the layer. For example, all the light engine pixels marked "8" can correspond to optical elements that lie on layer 8. Therefore, a display block with 16 layers, each with 8×8 elements can be constructed so that each element can be illuminated by a different light engine pixel without being interfered with by other elements (assuming that light rays coming from the pixels are parallel and distinct). In other words, for that display block, there is a one-to-one correspondence between its optical elements and the light engine pixels.

Figure 6:
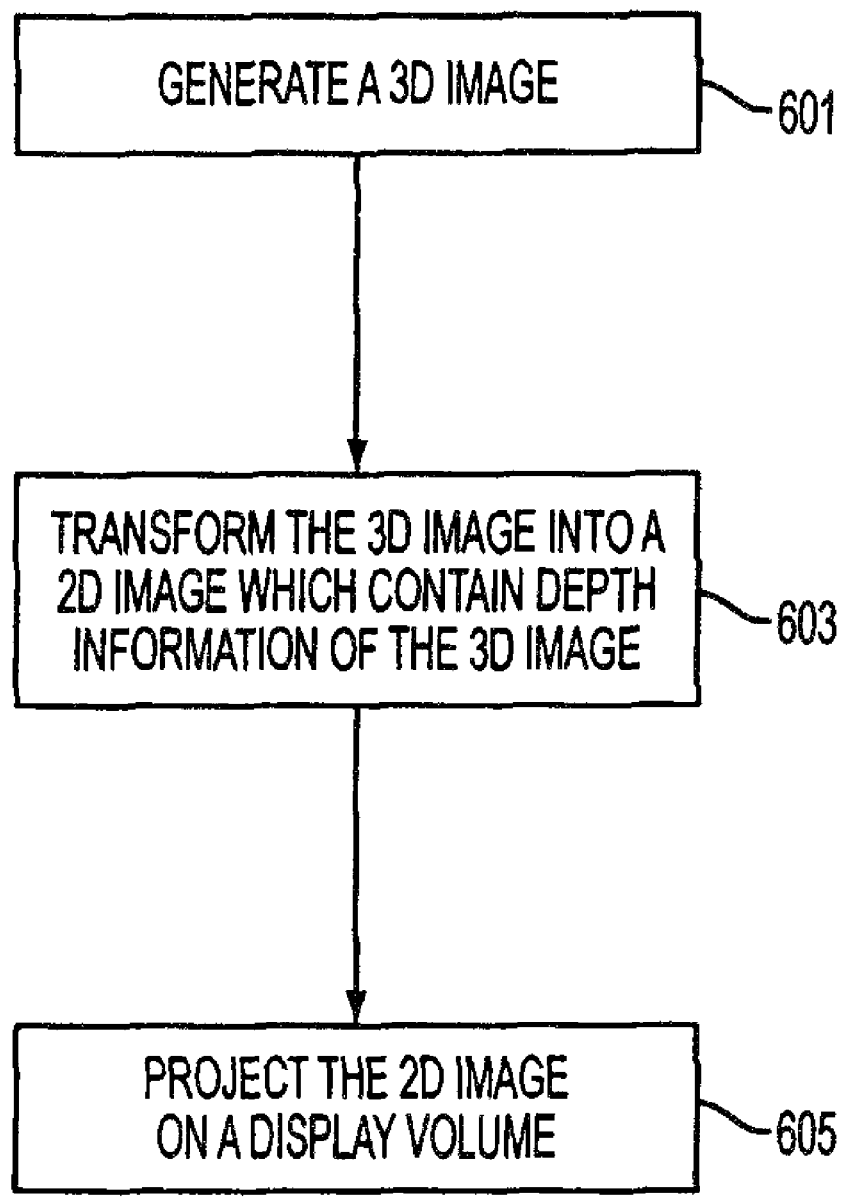
FIG. 6 is a flow chart illustrating the steps for displaying 3D images using a volumetric display system according to various embodiments of the present invention.

FIG. 6 is a flow chart illustrating the steps for displaying 3D images using a volumetric display system generally illustrated in FIG. 4. The first step 601 is to generate a 3D image to be displayed in a particular display block. The 3D image is in the format of a 3D data array, wherein each element in the data array corresponds to a passive optical element in the display block and contains color and brightness information of the optical element. The second step 603 is to transform the 3D image into a 2D image wherein the 2D image contains depth information, among other information, of the 3D image. An example format the 2D image is illustrated in FIG. 5. The 2D image is a 2D data array, wherein each element in the data array corresponds to a light engine pixel and contains the color and brightness information of the pixel. Transformation of the 3D image into the 2D image is done by mapping elements in the 3D data array to the 2D data array according to the one-to-one correspondence between the optical elements and the pixels. The 2D image contains depth information because pixels in the 2D image correspond to different layers of optical elements. The third step 605 is to project the 2D image onto the display block, resulting in a 3D image. Using the same steps, animated 3D images can be displayed by repeatedly generating 3D images, transforming them into 2D images, and projecting them in the display block.

Figure 7:
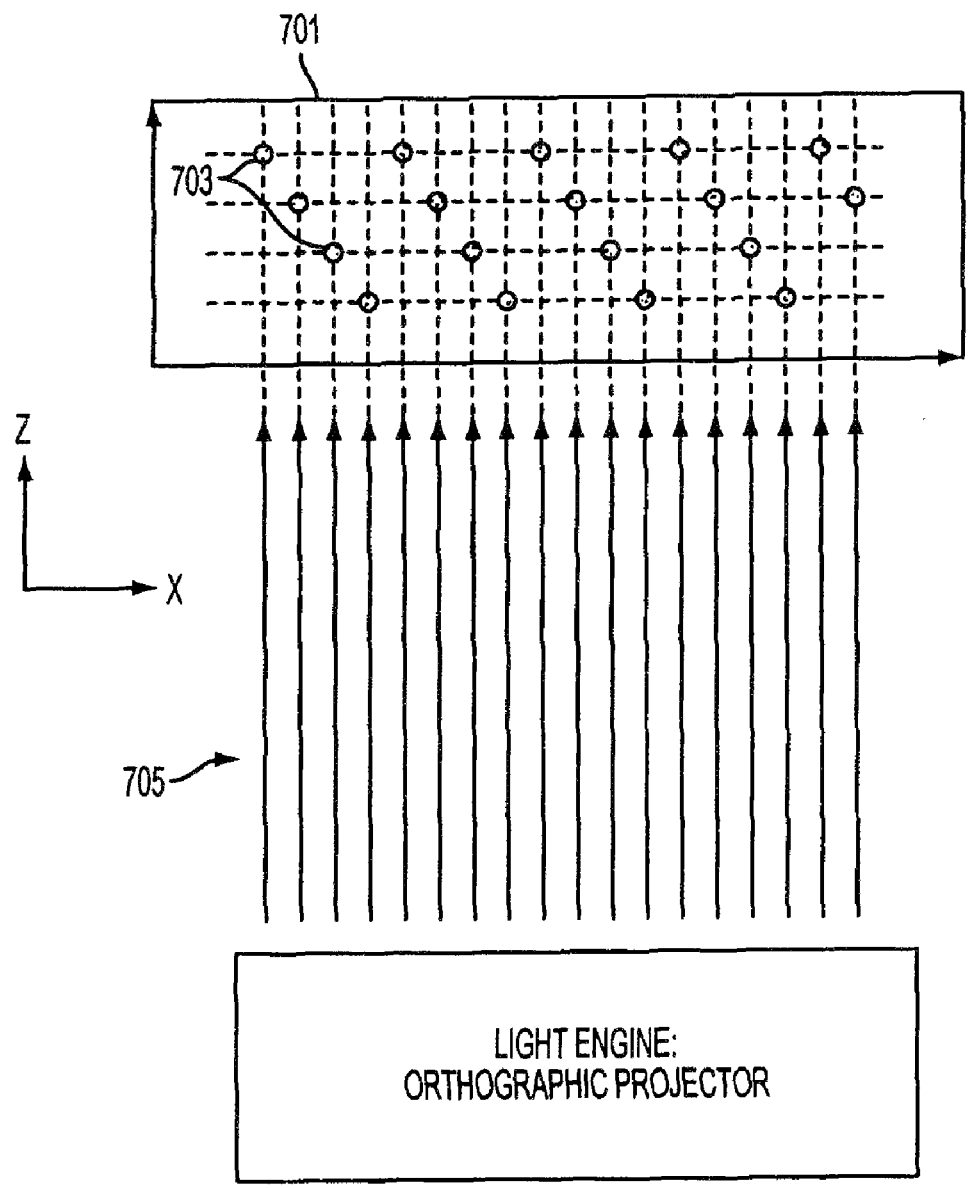
FIG. 7 is a cross-sectional view of an example of a volumetric display system, wherein the grid of passive optical elements forms a regular pattern according to various embodiments of the present invention.

FIG. 7 is a cross-sectional view of an example of a volumetric display system. This example of a volumetric display system is of the type of the system generally illustrated in FIG. 4, in the sense that the passive optical elements 703 in the system are regularly spaced within the display block 701. The light rays 705 are parallel to each other. Each light ray illuminates a different optical element. Because of this regular spacing, there may be viewing directions (angles from which a viewer looks at the display) at which optical elements are occluded by other optical elements. Therefore, it may be advantageous to break the regular structure of this grid. This may be done for example by placing the optical elements at locations that are random or semi-random perturbations of their original locations in the grid as described in greater detail in connection with FIGS. 8-10.

Figure 8:
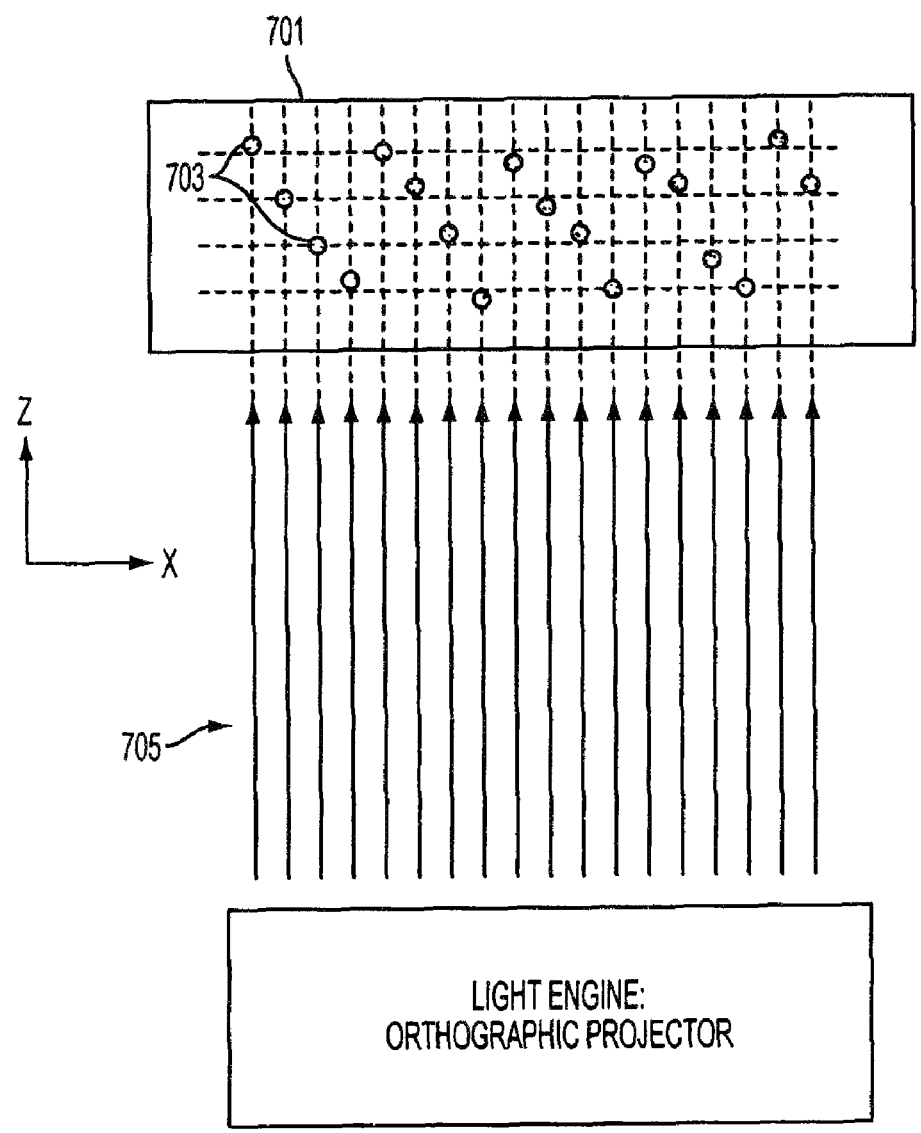
FIG. 8 is a cross-sectional view of a volumetric display system generally illustrated in FIG. 7, wherein the locations of the passive optical elements are perturbed according to various embodiments of the present invention.

FIG. 8 illustrates an example of a configuration of optical elements 703 in a grid in which they are slightly perturbed on the Z-axis in a random fashion. Note that each light ray still illuminates a different optical element.

Figure 9:
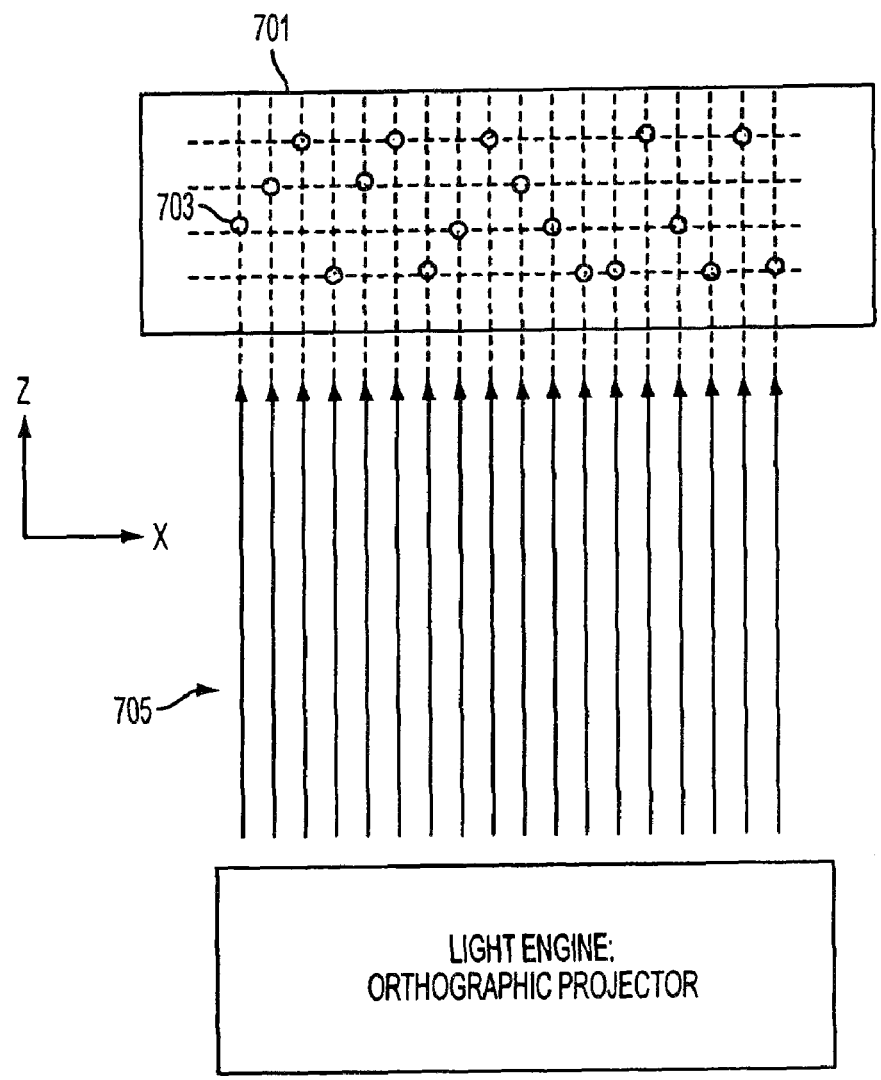
FIG. 9 is a cross-sectional view of a volumetric display system generally illustrated in FIG. 7, wherein the locations of the passive optical elements are perturbed according to various embodiments of the present invention.

FIG. 9 illustrates an example of a configuration of optical elements 703 in a grid in which they are perturbed on the X-axis in a semi-random fashion. As shown, the optical elements 703 are no longer uniformly spaced at each depth, but instead semi-randomly spaced so that there is a less regular structure while each light ray can still illuminate a different optical element, preserving image resolution. To ensure that each light ray can still illuminate a different optical element, the optical elements 703 are not perturbed with an arbitrary distance. Instead, they are perturbed with unit distances, each unit distance being the distance between the centers of two adjacent light rays. Also, the perturbation of one optical element will limit the locations where other optical elements can be perturbed. As should be apparent to one of ordinary skill in the art, the perturbation of elements 703 illustrated in FIG. 9 could additionally or alternatively be performed in the Y-axis (not shown).

Figure 10:
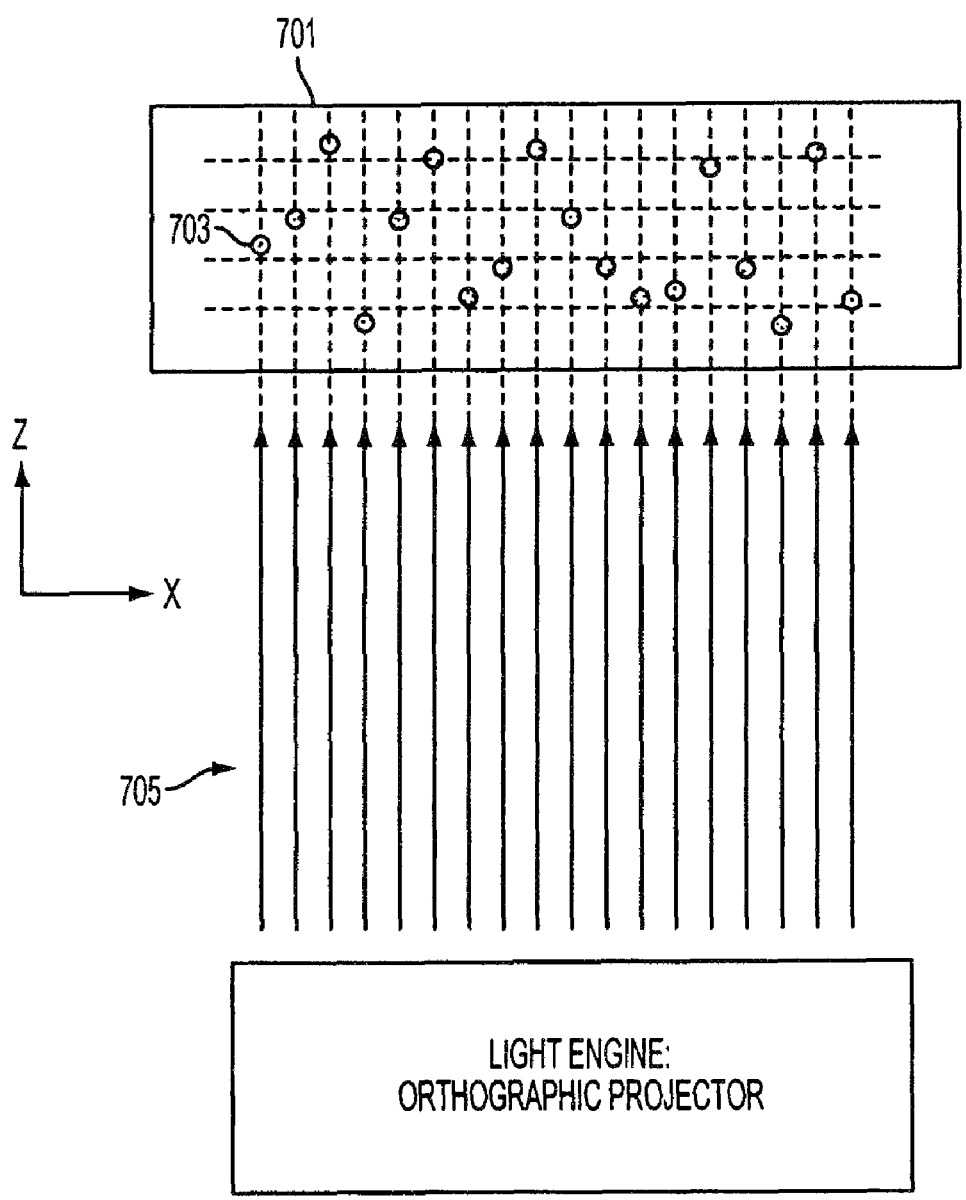
FIG. 10 is a cross-sectional view of a volumetric display system generally illustrated in FIG. 7, wherein the locations of the passive optical elements are perturbed according to various embodiments of the present invention.

FIG. 10 illustrates an example of a configuration of optical elements 703 in a grid in which they are slightly perturbed on the Z-axis in a random fashion as with FIG. 8 and also perturbed on the X-axis in a semi-random fashion as with FIG. 9. Each light ray 705 still illuminates a different optical element. As should be apparent to one of ordinary skill in the art, the perturbation of elements 703 illustrated in FIG. 10 could additionally or alternatively be performed in the Y-axis (not shown) in a semi-random fashion as with FIG. 9.

The perturbations of optical elements 703 illustrated by FIGS. 8-10 break the regular structure of the grid of elements 703. This makes the structure less distracting to the viewer. It also increases the visibility of elements 703 as a function of the viewing angle of the viewer. In the case where optical elements 703 are perturbed in all three dimensions, the number of elements visible to the viewer may remain more or less constant when the viewer moves around the display block 701.

Although the perturbations in the Z-axis in FIGS. 8 and 10 are described as being random, it should be apparent that the perturbation could be made using any suitable technique, such as non-random or semi-random placement. As used in connection with FIGS. 8 through 10, semi-random placement refers to placement according to placement that is used to increase the visibility of optical elements 703 but that is not according to a completely random technique.

In order to illuminate the optical elements 703, it is desirable to keep track of the locations of the optical elements 703 when manufacturing the display block 701. Alternatively, suitable optical detectors could be used to determine the locations of the optical elements 703, for example by sweeping the display block 701 with a point light source in one axis while observing reflections (and hence optical elements) in the other two axes. Keeping track of the locations of the optical elements 703 in the display block 701 is desired because these locations are used in the transformation of a 3D image to the 2D image to be projected. For example, when an optical element is perturbed in the X-axis as illustrated in FIG. 9, the optical element is no longer illuminated by the same light ray (i.e., the light ray produced by the same light engine pixel). Therefore, in order to produce (approximately) the same 3D image, the light rays from the light engine needs to be rearranged. In other words, the 2D image to be projected needs to be changed.

Figure 11:
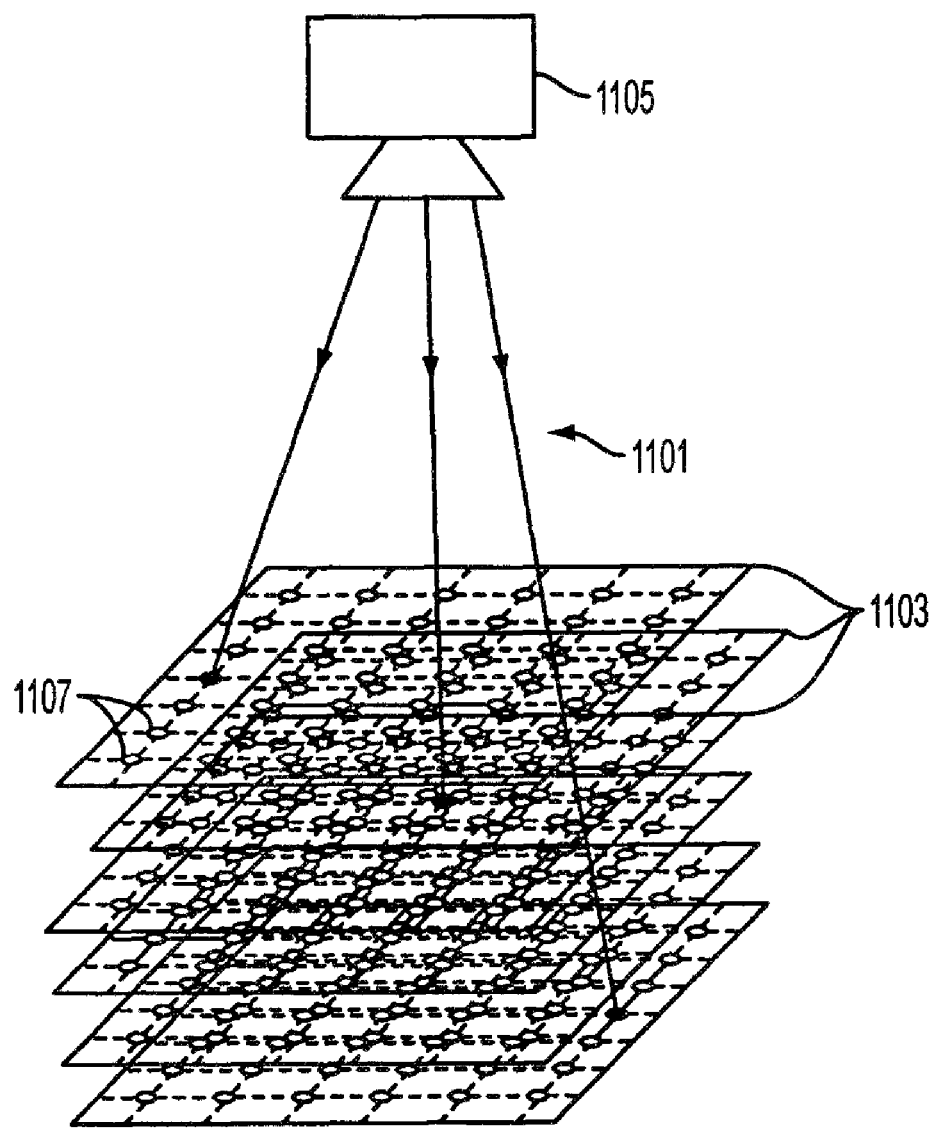
FIG. 11 is a perspective view of an example of a volumetric display system according to various embodiments of the present invention.

FIG. 11 is a perspective view of another example of a volumetric display system. Similar to the system generally illustrated in FIG. 4, passive optical elements 1107 are located on layers 1103 that are parallel to each other. Light rays 1101 from the projector 1105, however, are not parallel to each other. It is possible to rearrange the location of the optical elements 1107 so that each can be illuminated without interference from other elements.

Figure 12:
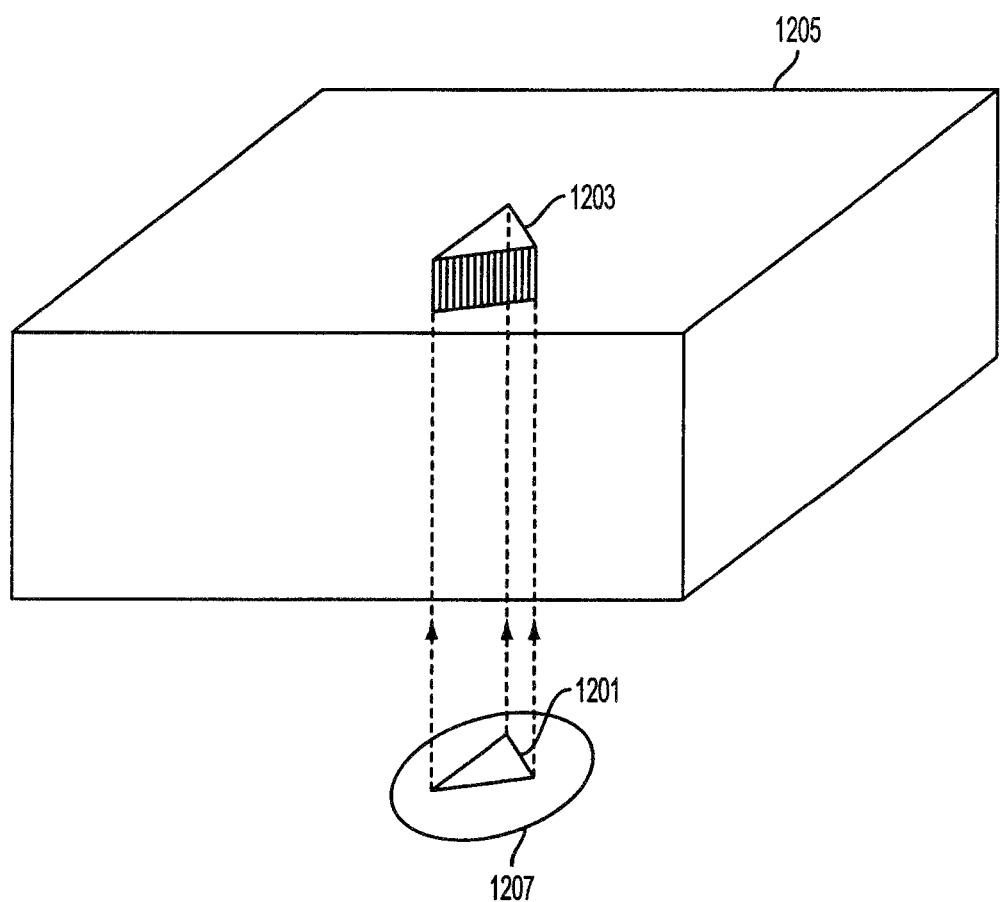
FIG. 12 is a perspective view of a volumetric display system displaying a 3D image according to various embodiments of the present invention.
Figure 13:
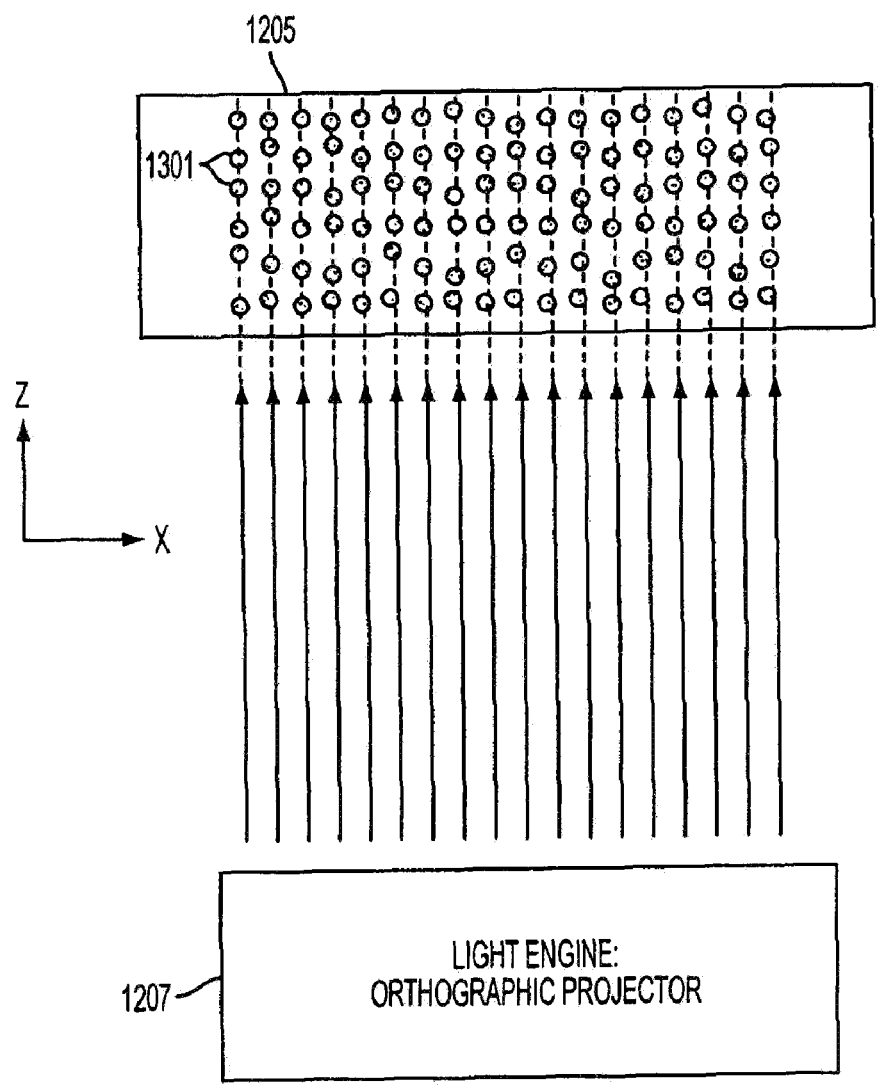
FIG. 13 is a cross-sectional view of an example of a volumetric display system according to various embodiments of the present invention.

FIG. 12 illustrates a volumetric display system, according to various embodiments of the present invention. In this system, a 2D image 1201 is projected by a light engine 1207 to form a 3D image 1203 in the display block 1205 by simultaneously illuminating columns of passive optical elements in the display block 1205. FIG. 13 is a cross-sectional view of the volumetric display system illustrated in FIG. 12. As shown, optical elements 1301 form a grid inside the display block 1205, and each vertical column of the grid is illuminated by a distinct light ray from the light engine 1207. Therefore, points in the 2D image 1201 are transformed to columns of points in the display block 1205, resulting in a 3D shaped image 1203. As shown in FIG. 13, the optical elements 1301 within each column may be perturbed in the Z-axis (vertical) direction to improve the appearance of the 3D image 1203 by increasing the visibility of the elements 1301 and removing the appearance of a regular structure of the elements 1301. It should be apparent to one of ordinary skill in the art that this aspect of the invention could be implemented without perturbing the elements 1301. 3D images created in this volumetric display system may also be animated and put in motion if desired.

Figure 14:
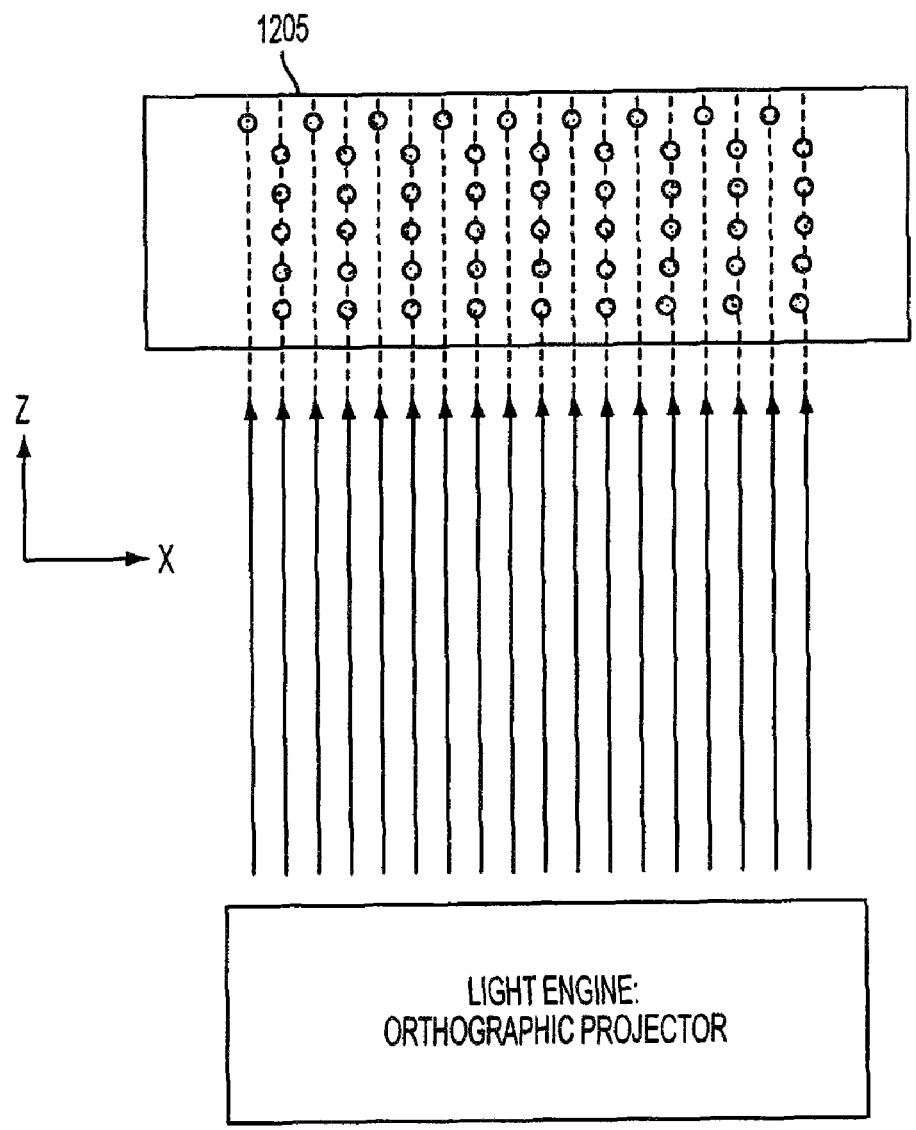
FIG. 14 is a cross-sectional view of an example of a volumetric display system according to various embodiments of the present invention.

FIG. 14 is a cross-sectional view of another embodiment of the volumetric display system, which can also be used to display 3D images. As illustrated, the passive optical elements of the top-level plane inside the display block 1205 are not aligned with other optical elements in the Z-axis. Thus, each optical element on the top-level plane may be illuminated by a distinct light ray from the light engine, without being obstructed by other optical elements. This enables the display of 3D objects with a top surface, which can be assigned arbitrary textures. Textures of vertical side surfaces of 3D objects displayed by this system can vary in the horizontal plane. The optical elements within the columns can be perturbed in the vertical direction to increase the visibility of points. 3D images created in this volumetric display system can also be animated and put in motion if desired.

Interactive Volumetric Display Systems

In a volumetric display system according to various embodiments of the present invention, the 2D images being projected, whether static or animated, can be generated using any suitable equipment. Furthermore, in some embodiments, a user can interactively control the generation of the 2D images while viewing the projected 3D images.

Figure 15:
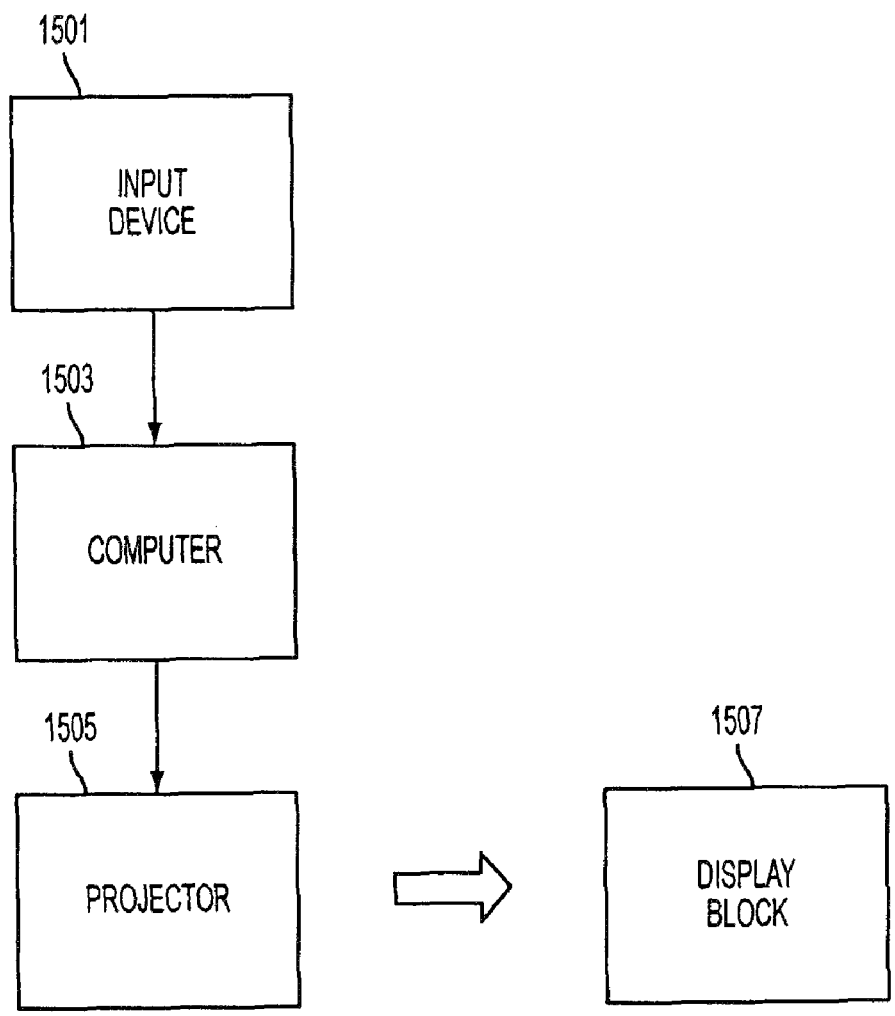
FIG. 15 is a system diagram of an interactive volumetric display system according to various embodiments of the present invention.

FIG. 15 illustrates an example of such a system. As shown, a computer 1503 generates and feeds 2D images to a video projector 1505, which then projects the images into the display block 1507 (e.g., a glass block) in order to create 3D images. In some embodiments, a user of the system may control the generation of the images in the computer using an input device 1501, while simultaneously viewing the 3D images.

Figure 16:
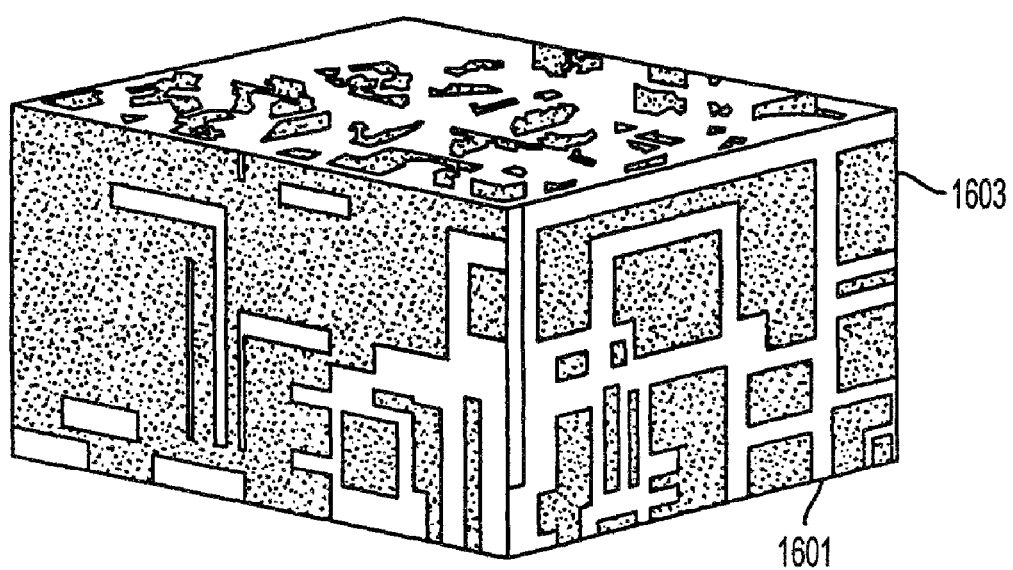
FIG. 16 is a perspective view of a display block used in a 3D game system according to various embodiments of the present invention.

Some embodiments of the present invention may be used to implement a game. In this game, a volumetric display system is used to display various 3D objects. Through a controller, a viewer controls the motion of one or more objects being displayed, and seeks to achieve goals predetermined in the game design. For example, as illustrated in FIG. 16, a 3D game similar to Pacman® may be implemented. As shown, a series of passageways 1601 may be created in three dimensions in a display block 1603 (e.g., a glass cube). The viewer controls the movement of a game character in these passageways 1601 and captures targets located at various locations in the passageways 1601 While the traditional Pacman® game is played in two dimensions, the new game further challenges the viewer to find the targets in a 3D maze. The display block 1603 may be illuminated through its bottom surface using an orthographic light engine.

Figure 17:
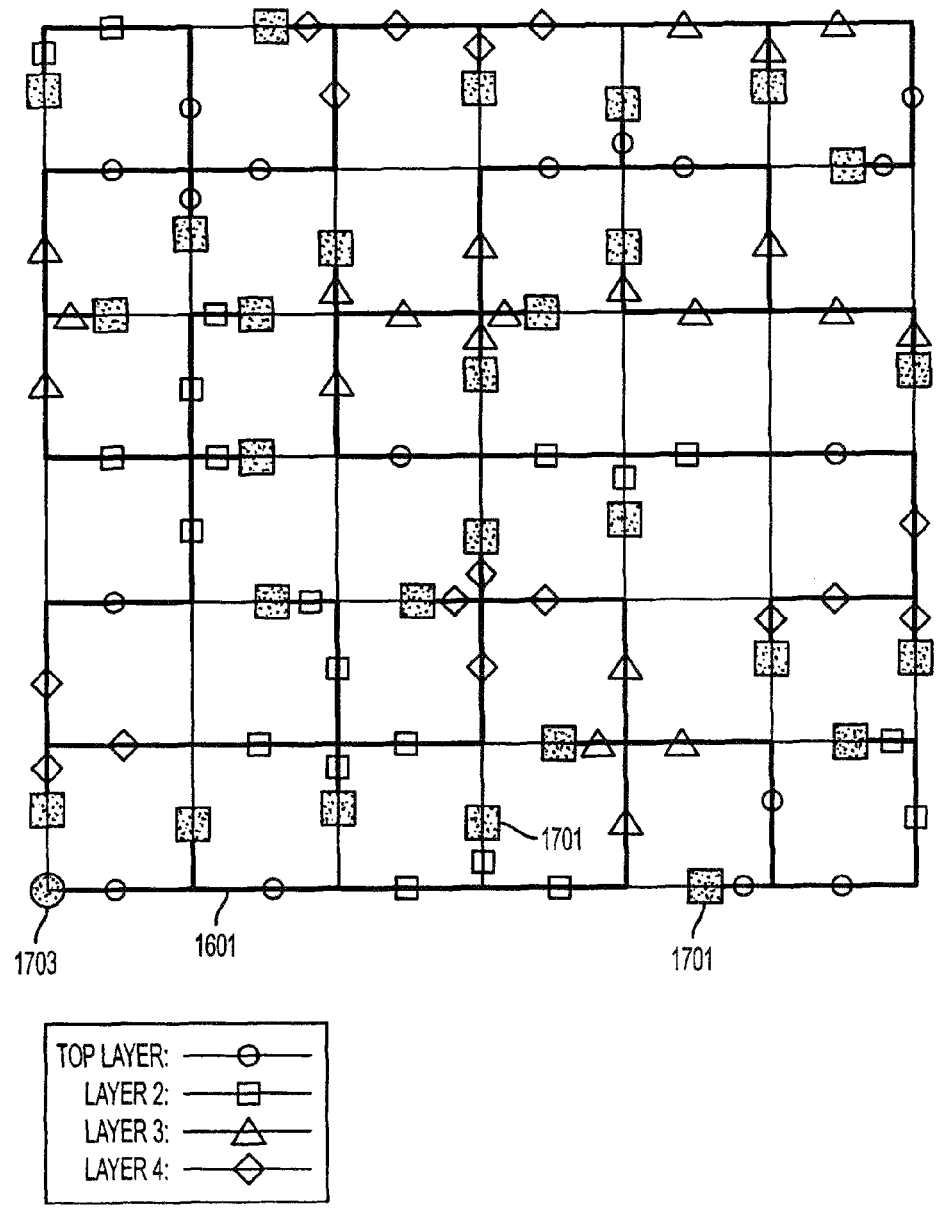
FIG. 17 is a diagram further illustrating the display block in FIG. 16.

A projection of the passageways 1601 and locations in the glass cube 1603 is illustrated in FIG. 17. As shown, the bold lines are passageways 1601 in the maze with different layer levels as indicated. The passageways 1601 are formed by optical elements. The small squares 1701 are locations along the passageways 1601. The viewer can move the game character 1703 along the passageways 1601 in three dimensions, which is achieved by continuously illuminating the positions of the game character 1703 in the passageways 1601 with a certain color. When the game character 1703 moves to a small square, the square is illuminated by a different color, notifying the viewer that the target has been captured.

Other Variations

Figure 18:
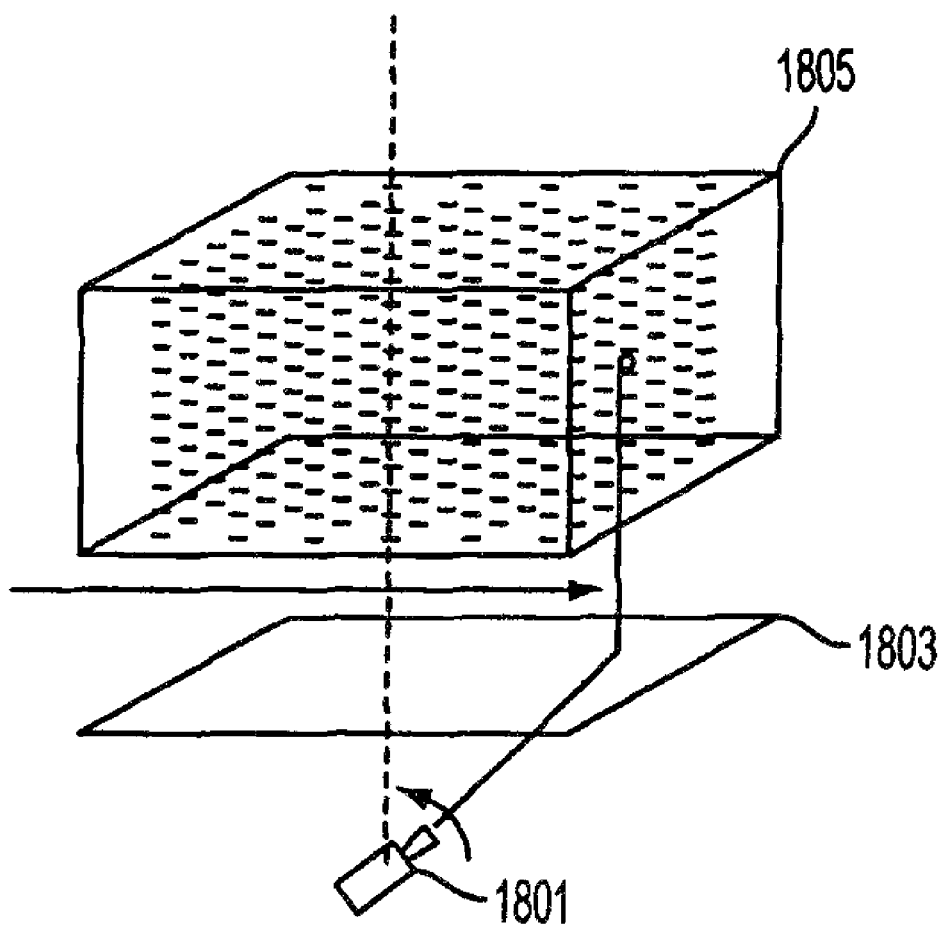
FIG. 18 is a perspective view of a volumetric display system using a laser pointer according to various embodiments of the present invention.

FIG. 18 illustrates another embodiment of a volumetric display system. As shown, instead of a projector, a laser pointer 1801 is used as the light source. In this example, the pointer rotates so that its beam raster scans the area of the Fresnel lens 1803. The scanning process is fast such that a scan of the whole area of the Fresnel lens 1803 is completed within the integration time of the human eye. During the scanning, the pointer 1801 is turned on and/or off for each etched grid point, based on whether the 3D image requires the point to glow or not.

In a volumetric display system, a display block containing optical elements can be produced by means other than etching a glass or a plastic block using LID. FIGS. 19-25 illustrate various embodiments of the present invention wherein the display block is produced by stacking layers of transparent material.

Figure 19:
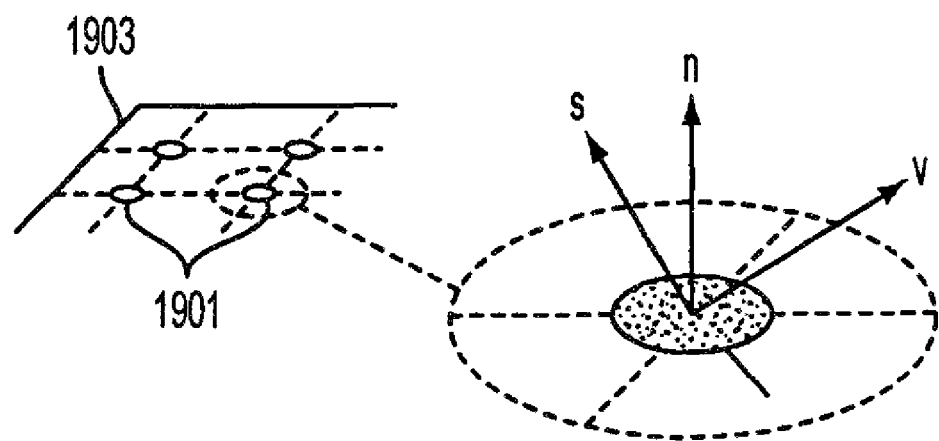
FIG. 19 is a diagram illustrating passive optical elements that are Lambertian reflectors, located on a transparent layer according to various embodiments of the present invention.

FIG. 19 illustrates optical elements 1901 made of a diffusely reflecting material, positioned on a transparent layer 1903. In this example, the diffusely reflecting material can be the Spectralon paint produced by LabSphere Inc. This material closely approximates Lambertian reflectance. A Lambertian reflector scatters incident light in all directions such that its radiance is the same from all viewing directions that lie within the hemisphere from which the reflector is visible. The radiance can be calculated as $L=(\rho/\pi)$ n·s, where $\rho$ is the albedo or reflectance of the surface, n is the surface normal and s is the source direction. As a result, the radiance of a Lambertian material will be independent of the viewing direction v. However, the area subtended by each element from the viewpoint of the viewer varies as a function of the viewing direction v. This is referred to as foreshortening, which causes the effective brightness of each element to fall off as n·v. This problem can be partially remedied using a reflector that is convex in shape rather than planar. In some embodiments, optical elements are hemispherical Lambertian reflectors. In this case the brightness of the optical elements falls off more gradually.

Figure 20:
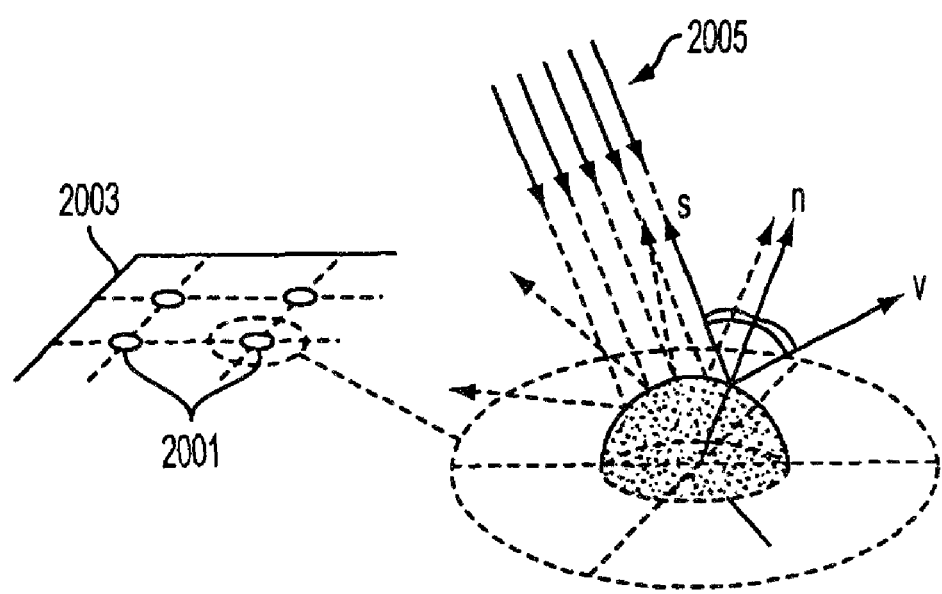
FIG. 20 is a diagram illustrating passive optical elements that are specular hemispherical reflectors, located on a transparent layer according to various embodiments of the present invention.

FIG. 20 illustrates optical elements 2001 that are curved specular reflectors 2001, positioned on a transparent layer 2003. These hemispherical reflectors 2001 provide more uniform distribution of brightness with respect to viewing direction. In some embodiments, each element can be a steel ball of the type used in ball bearings. In this case, the incident light 2005 is reflected in all directions except a very small section in the lower hemisphere. Moreover, because each reflected ray in any given direction is reflected by a single point on the sphere, the brightness of the element is more or less uniform with respect to the viewing direction.

Figure 21:
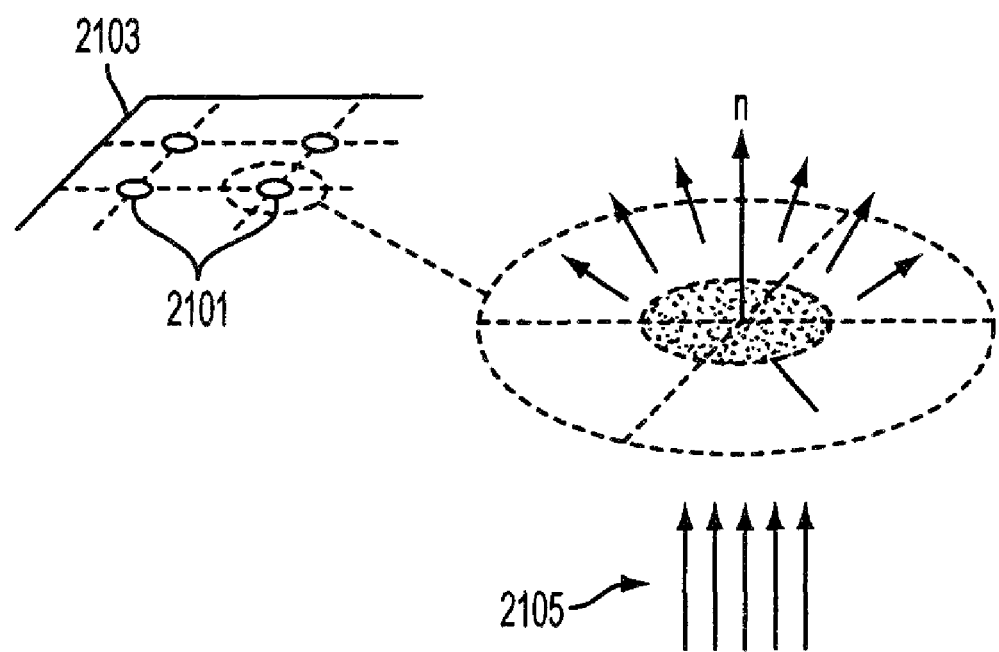
FIG. 21 is a diagram illustrating passive optical elements that are light diffusers, located on a transparent layer according to various embodiments of the present invention.

FIG. 21 illustrates optical elements 2101 that are light diffusers 2101, located on a transparent layer 2103. In some embodiments, the optical elements 2101 are created by roughening the surface of the transparent layer 2103 within the area bounded by the elements. In some embodiments, the transparent layer 2103 is a plastic sheet, and the elements are created by etch scattering patterns using a plastic printer. Incident light 2105 can be received by the diffuser 2101 from either above or below the layer. As shown, the incident light 2105 strikes the diffuser 2101 from below the layer and is scattered by the diffuser 2101 in all directions within the upper hemisphere.

Figure 22:
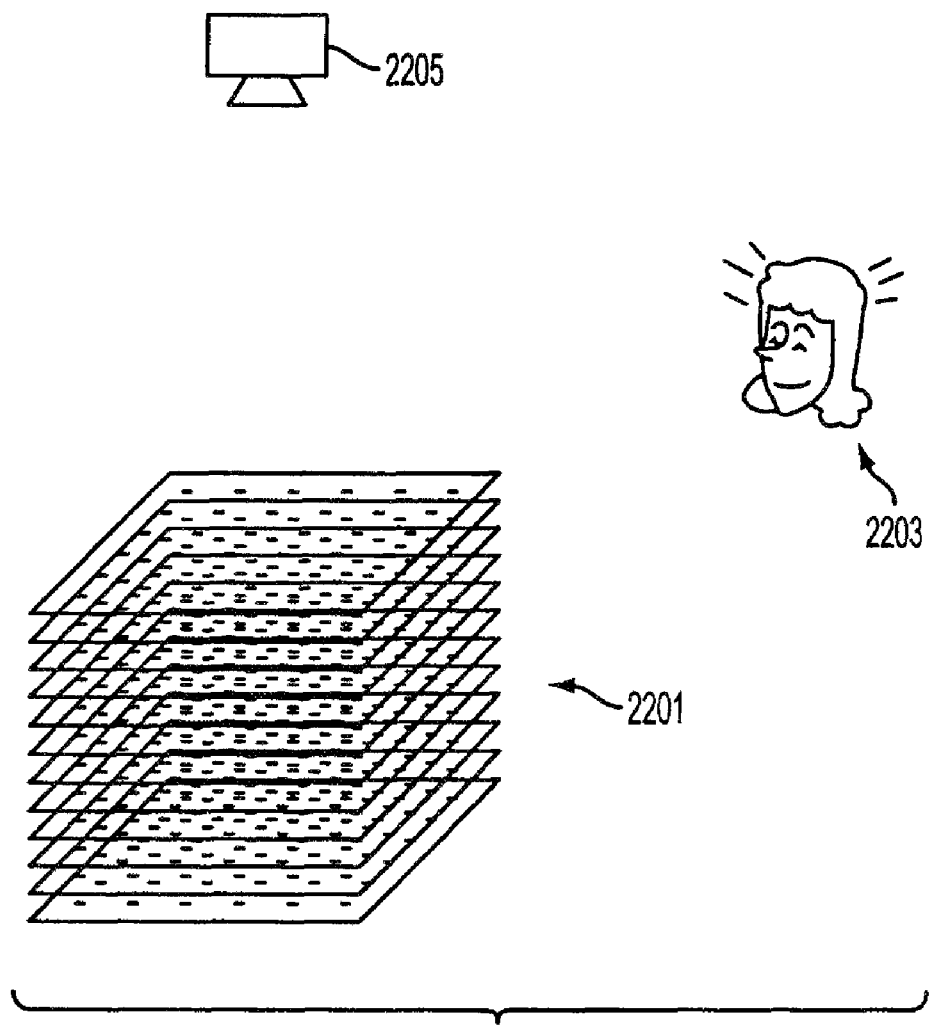
FIG. 22 is a diagram of a volumetric display system using reflective: optical elements according to various embodiments of the present invention.

FIG. 22 illustrates a configuration of a volumetric display system using reflective elements. In this system, the display block 2201 includes reflective elements placed on a stack of transparent layers. The viewer 2203 is located at the same side of the display block 2201 as the projector 2205. The viewer 2203 can move around the display block 2201 and view different aspects of the scene (not shown) being displayed. When the viewer 2203 moves, each eye receives a new perspective of the scene (not shown). Also, multiple viewers can view the 3D scene (not shown) being displayed simultaneously as there is no conflict of resources between the viewers.

Figure 23:
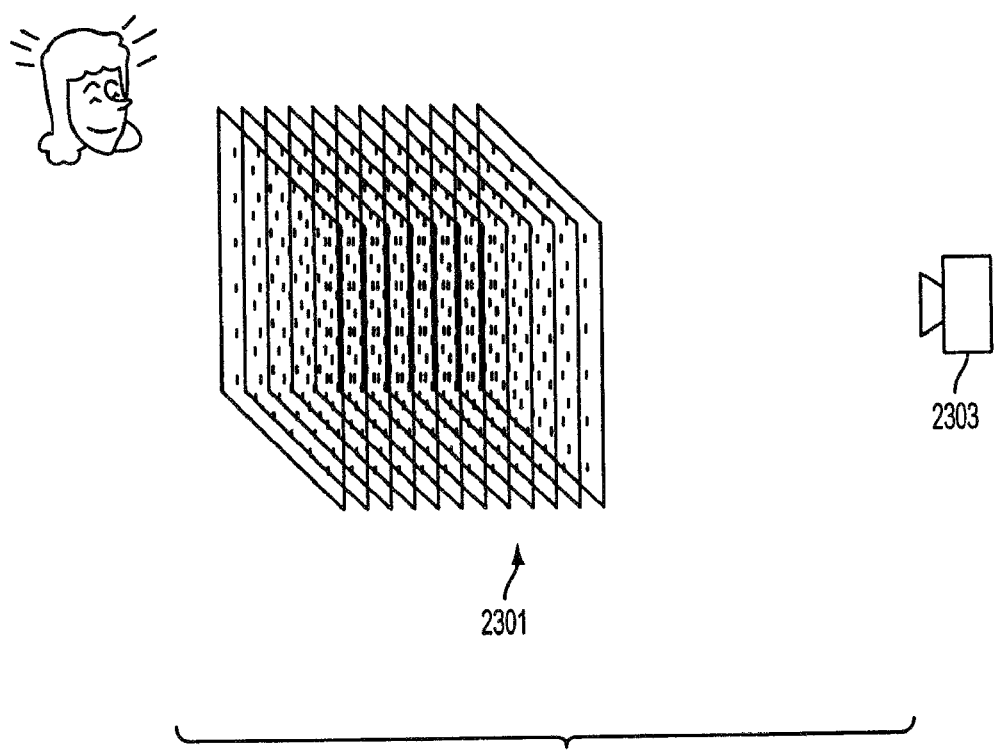
FIG. 23 is a diagram of a volumetric display system using diffusive optical elements according to various embodiments of the present invention.

FIG. 23 illustrates a configuration of a volumetric display system using diffusive elements. In this system, the display block 2301 includes diffusive elements placed on a stack of transparent layers. The diffusive elements are illuminated from the projector 2303 side and the image is viewed from the opposite side. Again, multiple viewers may view the displayed 3D scene at the same time.

Figure 24:
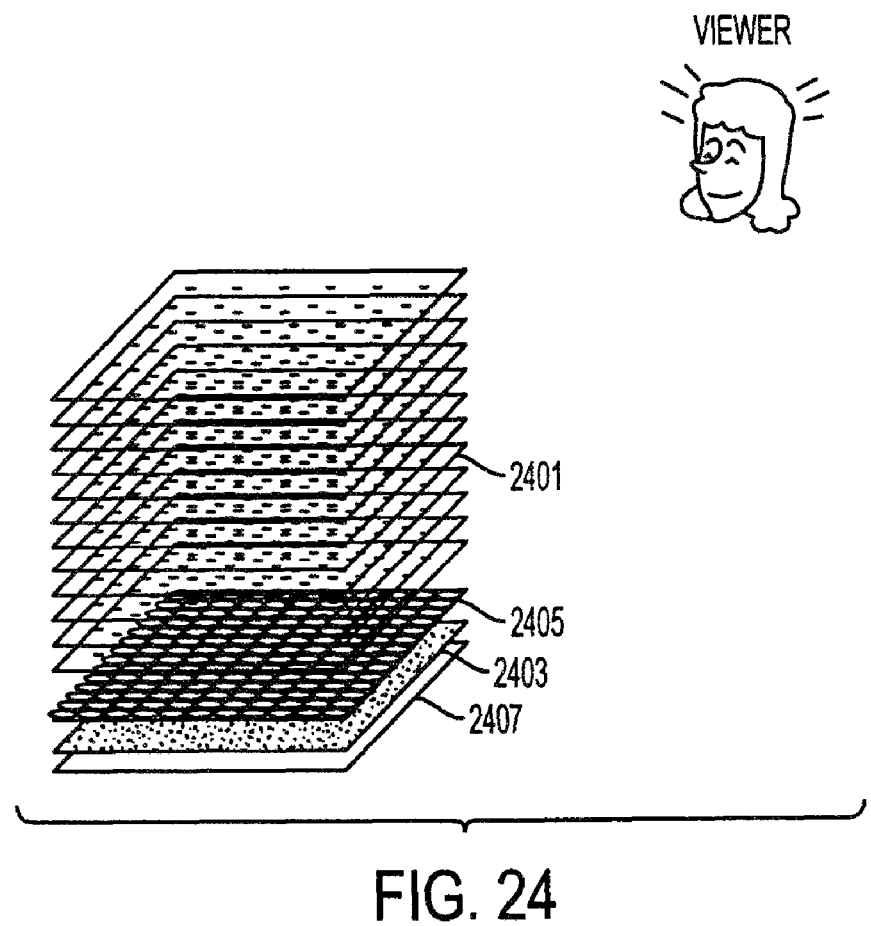
FIG. 24 is a diagram of a compact volumetric display system using diffusive optical elements according to various embodiments of the present invention.

FIG. 24 illustrates another example of a compact volumetric display system. In this system, the display block 2401 includes diffusive elements placed on a stack of transparent layers. The light source 2403 can be a liquid crystal display (LCD). Alternatively, it can be an array of densely packed light-emitting diodes (LEDs), or any other suitable light source. A lenslet array 2405 made of very small convex lenses can be used to convert the light from each pixel on the LCD or LED array 2403 into a parallel beam, focused on a single diffusive or reflective element. A backlight 2407 can be placed near the LCD array. Therefore, the display can be one self-contained unit.

Another alternative to producing a display block is to mold Lambertian reflectors, specular reflectors, or diffusers into a single plastic cube. The plastic solid can be coated with anti-reflection coating to ensure that reflections from its outer surface are minimized.

Figure 25:
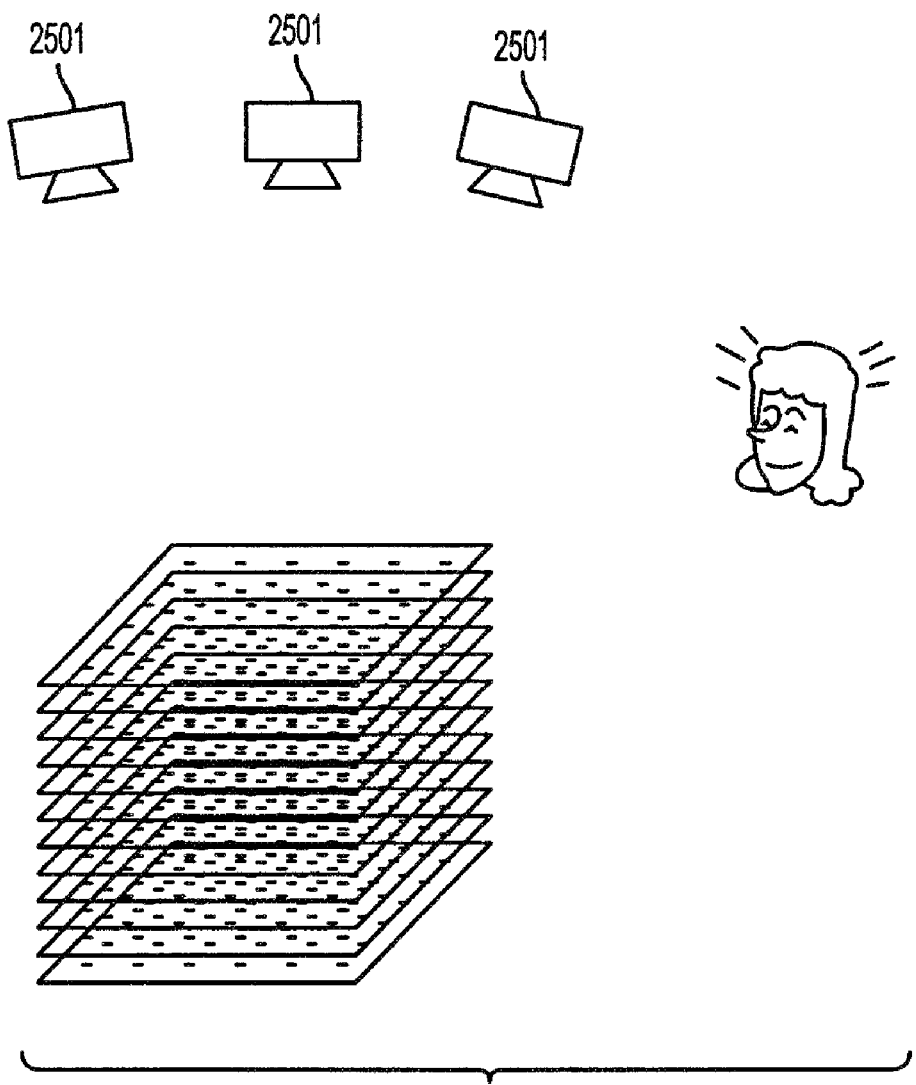
FIG. 25 is a diagram of a volumetric display system using multiple light sources according to various embodiments of the present invention.

FIG. 25 illustrates another volumetric display system using multiple light sources 2501. This remedies the situation where light rays from a single projector do not have full access to all the elements in a display. In this example, if one projector does not have access to a particular display element, due to obstruction by another element, another projector can be used to access the element. Multiple projectors can also be used to enhance the quality of the displayed image. When all projectors have access to all the display elements, each element can be controlled with a greater brightness range than when using a single projector.

Animating Images on a 3D Surface

According to various embodiments of the present invention, passive optical elements of the volumetric display system can be positioned to approximate a predetermined 3D surface, instead of forming a 3D grid.

Passive optical elements approximating a 3D surface can be made close to each other subject to the structural limitations of the display block. As long as a 3D surface of elements within a certain region is not parallel to, or close to being parallel to, the direction of the illuminating light rays, elements close to each other on a 3D surface can be illuminated by distinct light rays. In this way, the 3D surface in that region may be illuminated with a high resolution image.

Figure 26:
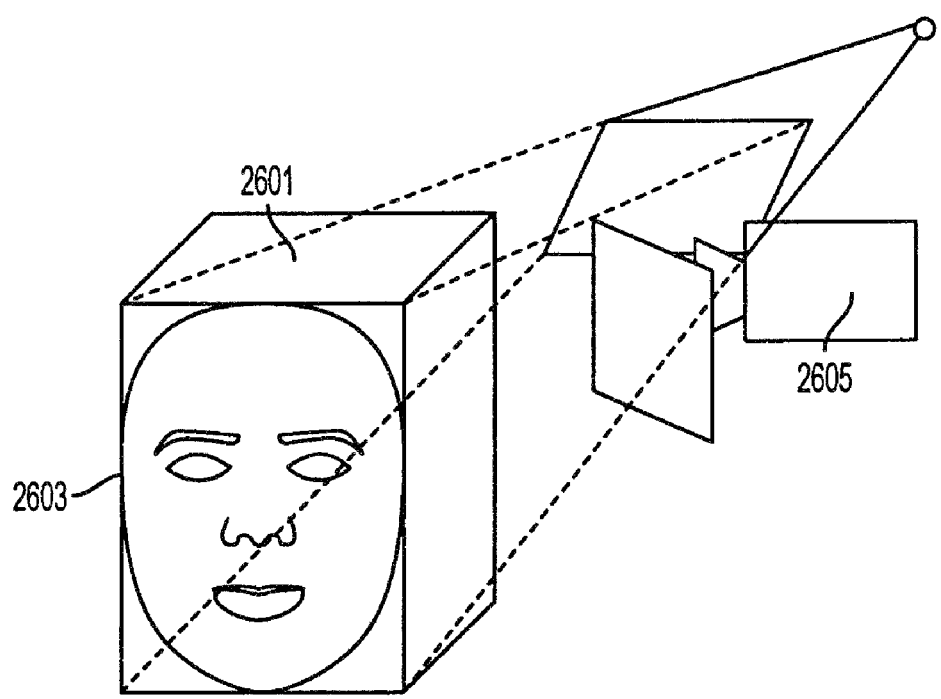
FIG. 26 is a diagram of a volumetric display system for animating 3D images of a face according to various embodiments of the present invention.

FIG. 26 illustrates such a volumetric display system. In this system, the optical elements inside a display block 2601 form a 3D surface 2603 that models a human face. A 2D image (not shown) is projected onto this 3D surface 2603. For example, the 3D surface 2603 may have a similar 3D shape to that of a costume mask that only covers the front part of a wearer's face. The 2D color face image (not shown) and the 3D surface 2603 formed by the optical elements can both be created from the same human face, if desired, to give the most realistic appearance. Similarly, the more closely the features and proportions of the face that is projected onto the 3D surface 2603 corresponds to that surface, the more realistic the 3D face image will appear.

To create a 3D face surface 2603, a 3D contour of a face of a model may be captured using any suitable technique. Using the captured 3D contour, the locations of the optical elements of the 3D surface can be determined by applying known methods, such as a meshing algorithm. The face may then be created (e.g., etched) in a block of glass 2601 using, for example, a LID technique.

If a 2D animated video showing facial movements is projected on the 3D surface 2603, the 3D surface image may appear to be animated. Although the 3D surface 2603 representing the face is static, the end result can be a 3D surface image that appears to show facial movements in a realistic manner when the deformations of the face during the facial movements are small. In certain embodiments, it may be desirable to project a talking face on the 3D surface 2603 while playing a corresponding spoken voice to give a life-like appearance.

Because the projection of video is likely to be done from a viewpoint that differs from the one used to capture the video, a transformation may be needed to morph the captured video before it is projected onto the 3D face surface. To enable this transformation to be achieved, it may be necessary to select a set of points (e.g., 100 points) from one frame in the captured video, and a corresponding set of points on the 3D face surface. For example, the user may select "inside corner of left eye" on the frame by moving a cursor on the display showing the frame and pressing a button, and on the face surface by moving a dot projected onto the face surface and pressing a button. In this way, the selected points on the 3D surface can be located at the positions where the points in the captured video should be projected—i.e., the image and surface are registered (or put in registration).

This set of points on the surface and image may then be used to create a mesh of triangles on the surface and the image. For example, Delauney Triangulation, as known in the art, may be used to create a mesh of triangles on each. Next, any suitable texture mapping technique, such as Open GL, may be used to take the texture from each triangle of the image and map it to the corresponding triangle of the surface. The texture of these surface triangles may then be projected onto the surface to display the image. In this way, the image is morphed onto the surface.

Alternatively, frames in the captured video can be morphed using other known methods, such as a polynomial or spline model, to compute the to-be-projected video. When the computed video is projected, the facial features show up at desired locations.

Figure 27:
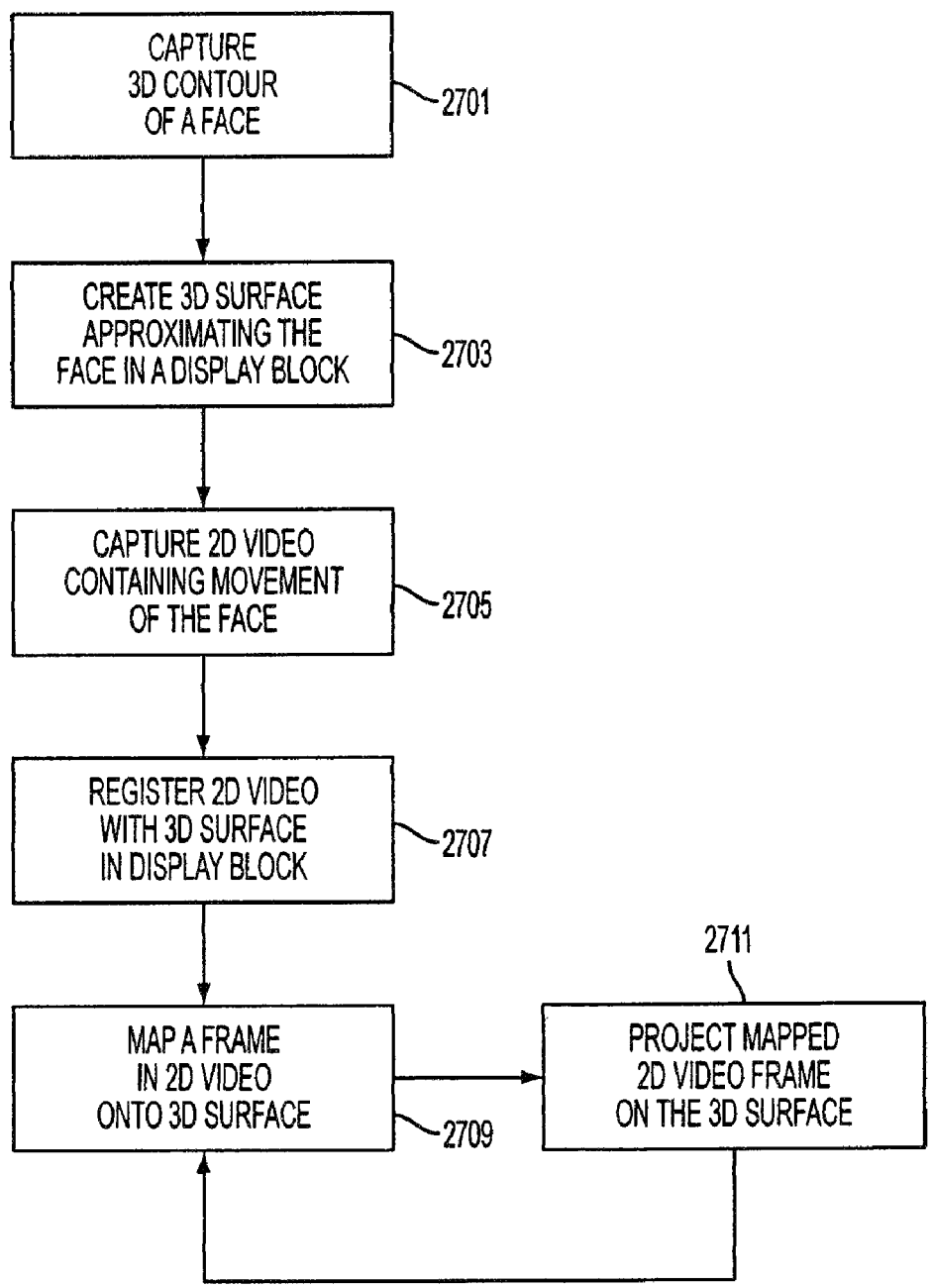
FIG. 27 is a flow chart illustrating the process of animating a 3D face image using a volumetric display system according to various embodiments of the present invention.

The process of animating a 3D face image using a static 3D surface of a face 2603 is illustrated by a flow chart in FIG. 27. As shown, the first step 2701 is to capture the 3D contour of a face. The second step 2703 is to create a 3D surface formed by optical elements inside a display block. The 3D surface approximates the face captured. The third step 2705 is to capture a 2D video containing the facial movements of the face. The fourth step 2707 is to register a frame in the 2D video with the 3D surface in the display block. This can be achieved by selecting a number of points from the frame and register the points with corresponding points on the 3D surface. The fifth step 2709 is to map the frame in the 2D video onto the 3D surface. The next step 2711 is to project the mapped 2D video frame on the 3D surface. After that, steps 2709 and 2700 are repeated for another frame in the 2D video, so that an animated 3D image is created.

According to various embodiments, an interactive volumetric display system that animates a talking face can be controlled interactively by human speech. For example, the system can further include face and/or recognition capabilities. The system may use face and/or voice recognition to detect the user and spoken questions and/or commands of the user. In response to questions and/or commands, the system may display face images on the 3D face surface that respond to the user. For example, these images may include animated video clips and/or be accompanied by audio. In some embodiments, certain video clips may be seamlessly stringed together to create a long video presentation by linking clips with similar ending and starting frames. In this way, the system can create the impression that the face inside the glass block is answering questions asked, and can do so dynamically.

Figure 28:
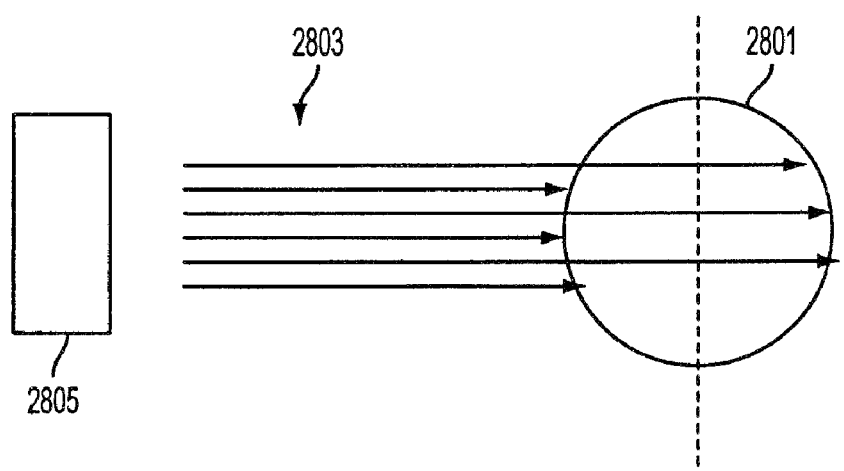
FIG. 28 is a cross-sectional view of a volumetric display system, wherein passive optical elements form a sphere according to various embodiments of the present invention.

FIG. 28 is a cross-sectional view of another example of a volumetric display system. In this system, the 3D surface 2801 formed by the optical elements is a sphere. As shown, the optical elements making up this surface 2801 are arranged so that some light rays 2803 strike the elements on the side closest to the light engine 2805 while other rays 2803 pass through this side and project onto the distant side. In order to project and animate images on the entire 3D surface 2801 using a single light engine 2805, each optical element on the surface 2801 is preferably positioned so that a distinct light ray will be able to reach and illuminate it.

A 2D image to be projected onto the 3D surface 2801 may be formed from two interlaced 2D images. One of the two interlaced 2D images is to be projected onto the hemisphere closer to the light engine 2805, and the other 2D image is to be projected onto the other hemisphere. These two 2D images may be projected at the same time onto the 3D surface 2801, or may be rapidly displayed in alternating frames (or another suitable sequence of frames). By projecting moving video onto the optical elements, the surface 2801 could appear to be moving. For example, the 3D image could be configured to imitate a spinning sphere.

Figure 29:
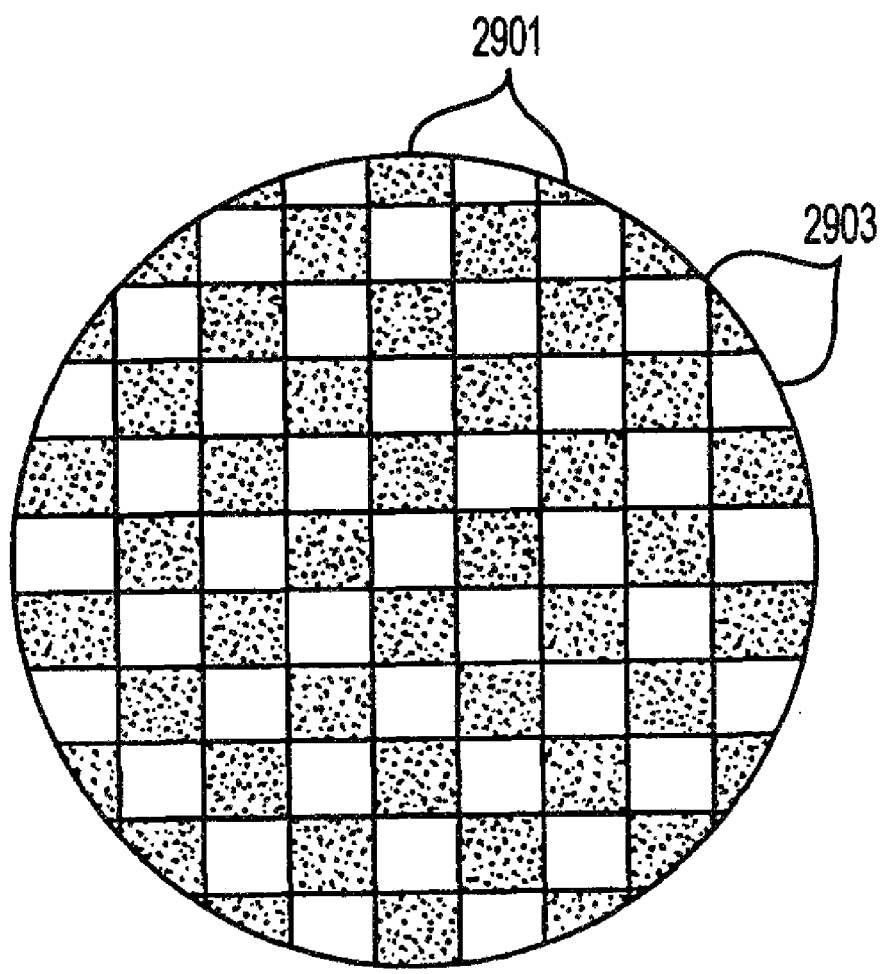
FIG. 29 is a diagram illustrating an example of projecting two images in a volumetric display system illustrated in FIG. 28 according to various embodiments of the present invention.

FIG. 29 illustrates an example of a technique using which one image may be projected on one surface of a sphere 2801 while another image is projected on the opposite surface of the sphere 2801. As shown in a large-scale form for ease of illustration, black areas 2901 within the circle represent light rays that are directed at optical elements on one surface whereas white areas 2903 within the circle represent light rays that are directed at optical elements on the other surface.

Correspondence of Image Pixels to Optical Elements

Because the number of pixels in a 3D image may have a higher resolution than the number of optical elements on which the image is to be projected, it may be necessary to transform the image to a lower resolution using any suitable technique. For example, in accordance with certain embodiments of the invention, the following algorithm may be used. For each optical element, an ellipsoid may be calculated with the optical element at its center. In some embodiments, this ellipsoid may be a sphere. Next, it is determined which pixels in the image fall within the area of the ellipsoid, and any such pixels are placed in a list for that ellipsoid. Preferably this list is generated for each optical element in advance, though it may also be generated when the image is being generated if acceptable performance is achieved. Next, for each list, a weighted average of the color components of each image pixel in this list is calculated. The weighting may be based on, for example, each pixel's distance from the point in the image corresponding to the optical element so that the pixels furthest from that point are given the lowest weighting. These weighted averages are then used to set the color of each optical element. As will be apparent to one of ordinary skill in the art, any suitably sized ellipsoids may be used, and the ellipsoids for neighboring elements may overlap. Preferably, the ellipsoids are equally sized as small as possible while still including every pixel in the image.

Increased Brightness of Volumetric Display

If increased brightness at a certain point in a volumetric display is desired, it can be achieved by etching multiple optical elements close to said point using any suitable technique, and illuminating the resulting cluster of optical elements. For example, in one approach, four elements may be positioned in a plane in the shape of a square and illuminated, for a total of four elements. In another approach, four elements may be positioned in a plane in the shape of a square and two more elements located equidistant from the center of the square on an axis perpendicular to the plane, for a total of six elements. In yet another approach, two squares of four elements may be located in parallel planes with the one square rotated 45 degrees with respect to the other, and two more elements each positioned on an opposite side of the two squares along an axis that passes through the centers of the two squares and that is parallel to the two planes, for a total of ten elements.

3D Display Systems Using Anamorphic Light Engines

FIGS. 30-39 illustrate systems for creating a high resolution 3D image on a 2D screen using anamorphic light engines. An anamorphic light engine, as used in this context, is a projector system that compresses images while projecting them.

Figure 30:
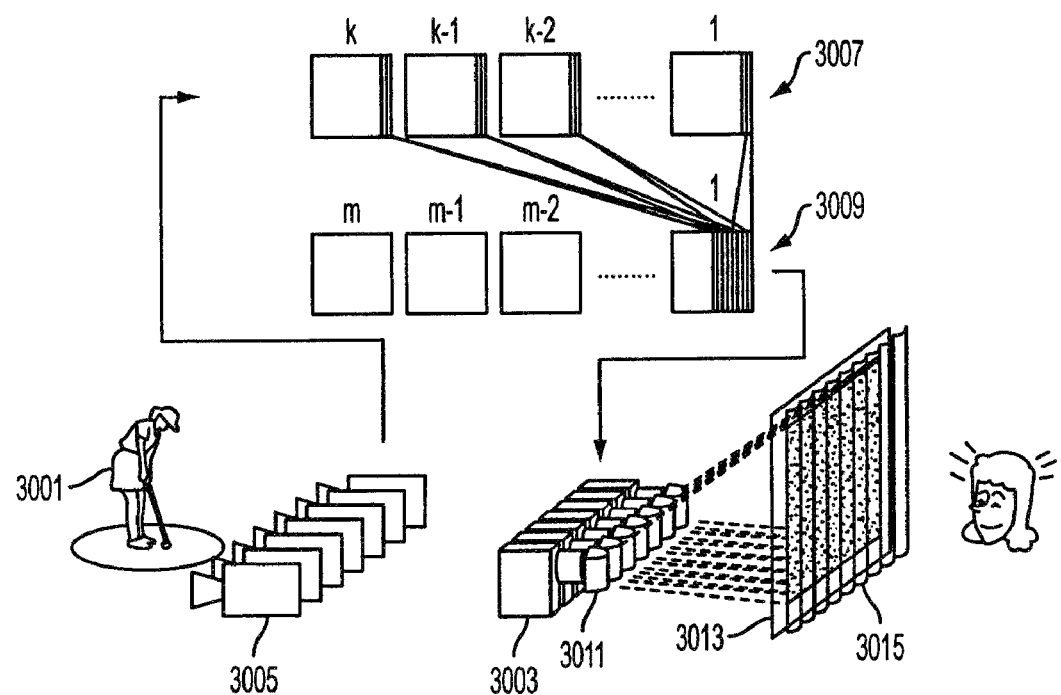
FIG. 30 is a diagram illustrating the operation of a 3D display system using anamorphic light engines according to various embodiments of the present invention.
Figure 31:
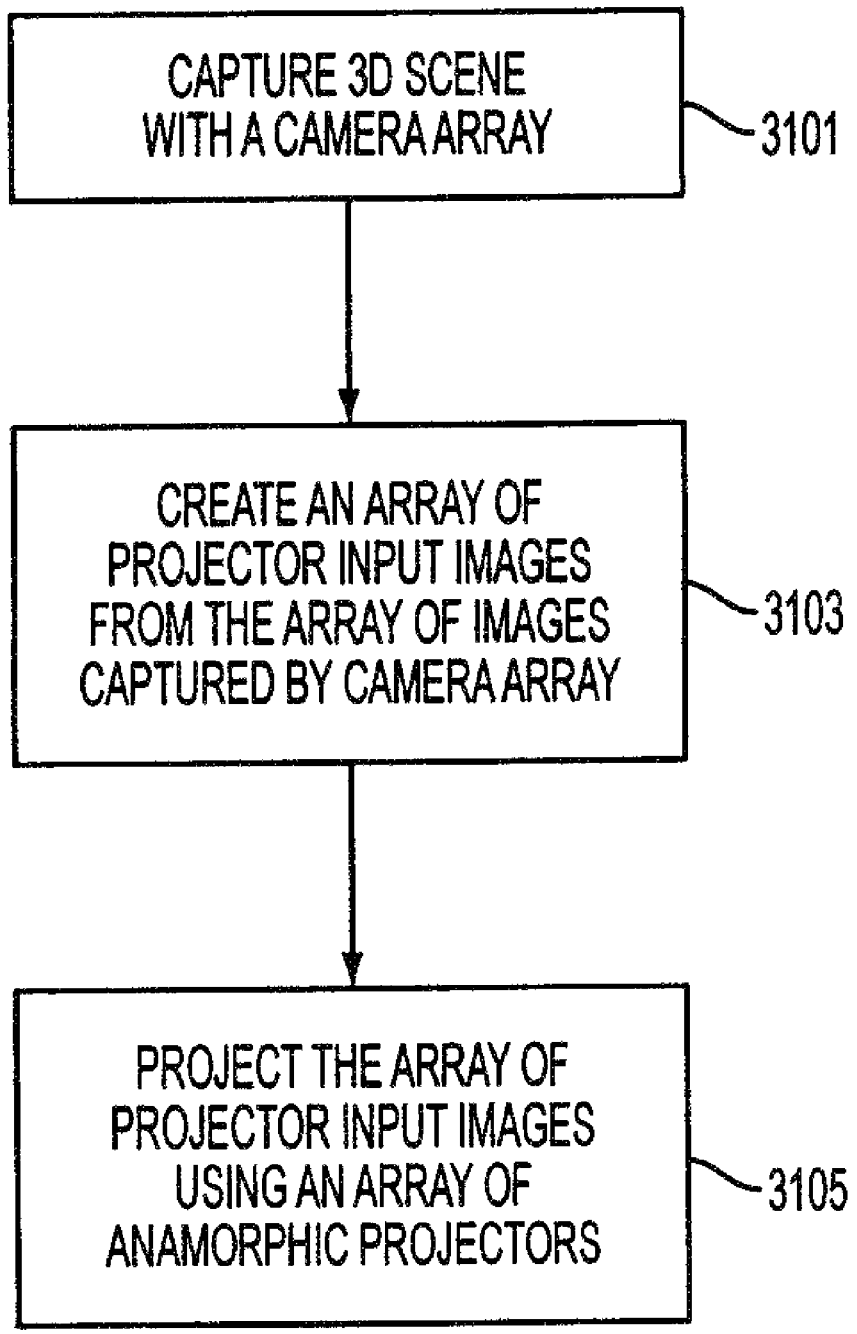
FIG. 31 is a flow chart illustrating the operation of a 3D display system using anamorphic light engines according to various embodiments of the present invention.

FIGS. 30 and 31 illustrate the steps involved for capturing and displaying a 3D scene 3001 in an example of a 3D display system using anamorphic light engines. In the first step 3101, an array of k video cameras 3005 is used to capture the 3D scene of interest 3001. At some point prior to this step, the cameras are preferably put in registration with each other, or a suitable algorithm is used to put the images in registration with respect to each other. At each instant of time, the camera array 3005 produces a set of k images 3007. In the second step 3103, these images 3007 are processed to obtain a set of in projection images 3009. For instance, the first k columns in the first projection image are obtained by concatenating the first columns of all the camera images 3007 in the same order in which they are arranged in camera array 3005. The next set of k columns in the first projection image is obtained by concatenating the second columns of all the camera images 3007 in the same order that the first columns were concatenated. The process is repeated for all columns needed to make up the first projection image. This process is then repeated for subsequent projection images by starting with the columns in the camera images 3007 following the last column used to form the previous projection image. In the third step 3105, these images 3009 are fed into the array of m projectors 3003. The projectors 3003 are coupled with anamorphic lenses 3011, which compresses the projection images 3009 in the horizontal axis. The compressed images are displayed on a diffusive screen 3013, and the compressed images on the screen 3013 are viewed through a lenticular lens array 3015. In this way, as a user views the display, the user will see particular columns of the camera images depending on the angle at which the user is viewing the display. In particular, one eye of the user would view images at one angle while the other eye would view images at a different angle, thereby allowing the user to perceive 3D scenes.

Figure 32:
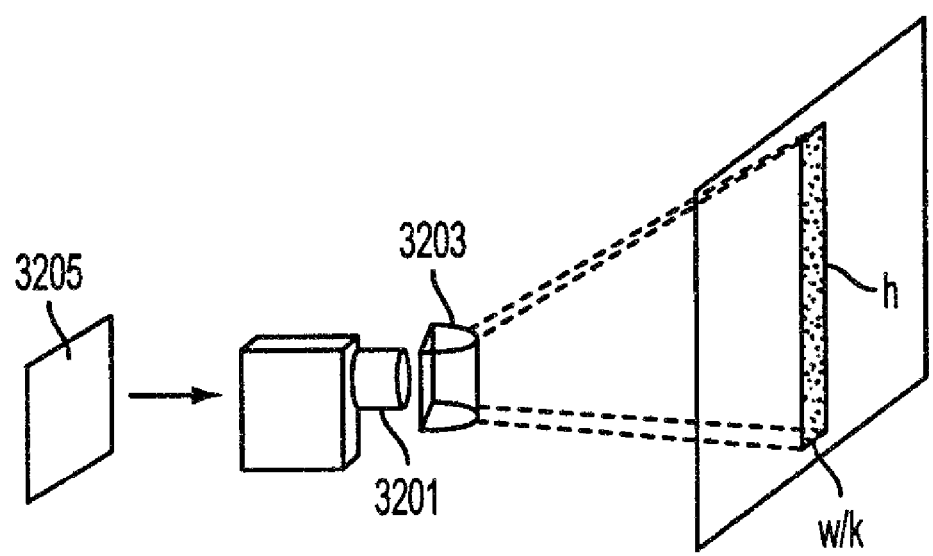
FIG. 32 is a perspective view of a single anamorphic light engine in the system illustrated in FIG. 30.

FIG. 32 illustrates a single anamorphic light engine in the system illustrated in FIG. 30. As shown, the anamorphic light engine includes a digital projector 3201 and an anamorphic lens attachment 3203. The lens attachment 3203 is used in conjunction with the projector 3201 to compress the image produced by the projector in the horizontal direction. This lens attachment 3203 in its simplest form can be a cylindrical lens that compresses the image produced by the projector lens in one of its two dimensions. Additionally, the anamorphic lens attachment 3203 can include corrective lenses to compensate for the chromatic aberrations, astigmatism, and other effects produced by the cylindrical lens.

Figure 33:
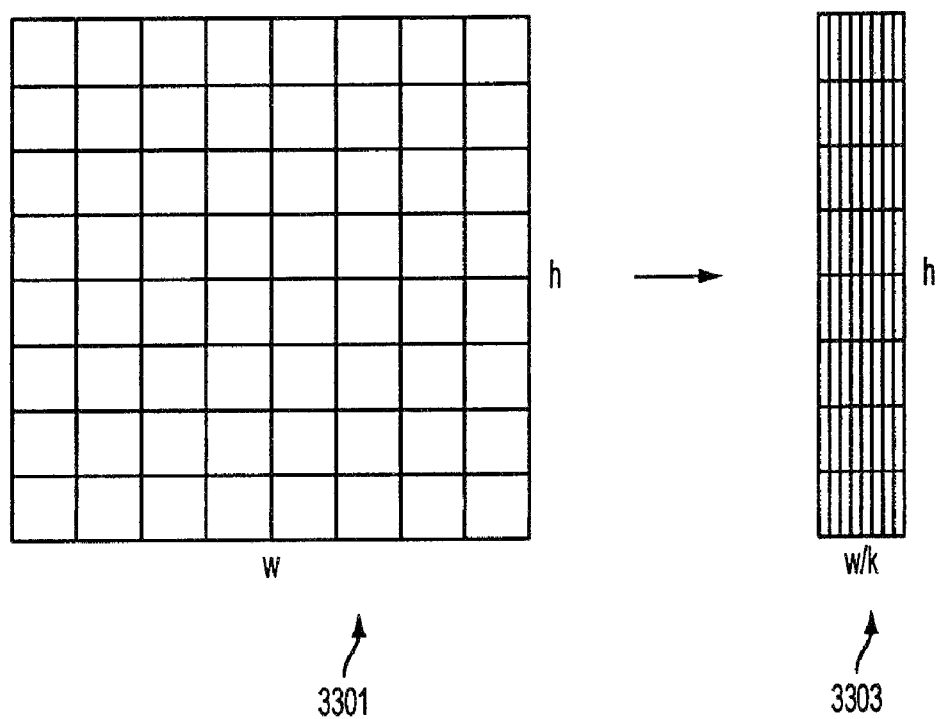
FIG. 33 is a diagram illustrating the compression of an image by an anamorphic light engine according to various embodiments of the present invention.

FIG. 33 illustrates the compression of an image by the anamorphic light engine illustrated in FIG. 32. As shown, the input image 3301 is compressed to the output image 3303 by a factor of k. The width of the image is reduced by a factor of k while the brightness of the image is increased by a factor of k.

Figure 34:
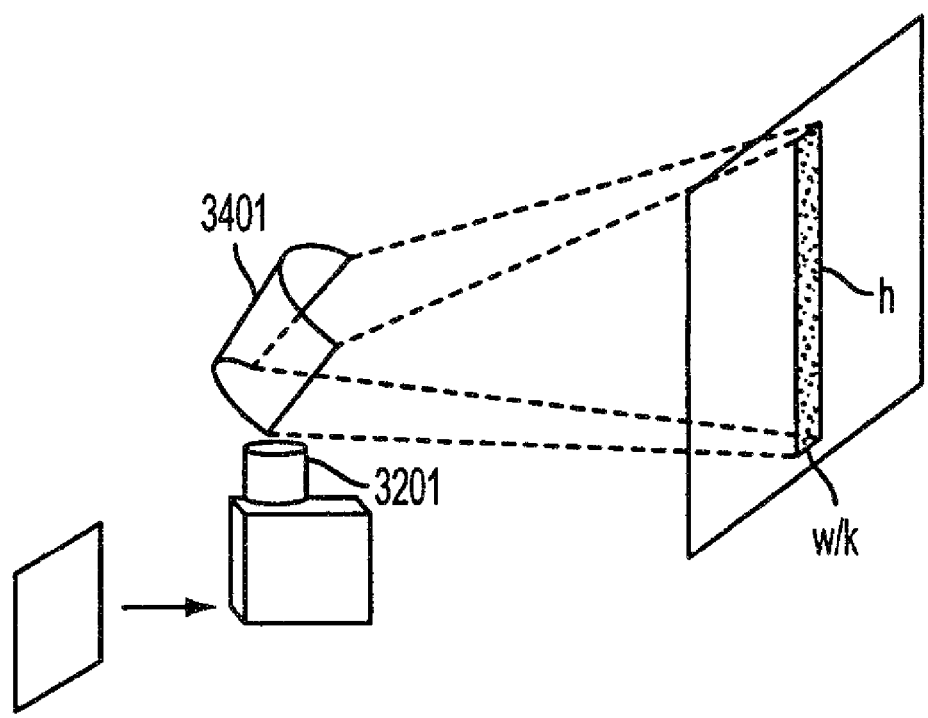
FIG. 34 a perspective view of an anamorphic light engine using a curved mirror according to various embodiments of the present invention.

FIG. 34 illustrates another example of an anamorphic light engine. The anamorphic light engine in this example uses a curved mirror 3401 instead of an anamorphic lens. Given any mapping from the projector input image to points on the screen, one can design a mirror that, in conjunction with the lens of the projector, can achieve (or closely approximate) the mapping. The shape of the mirror may be computed by solving a numerical optimization problem that minimizes distortions in the final screen image.

Figure 35:
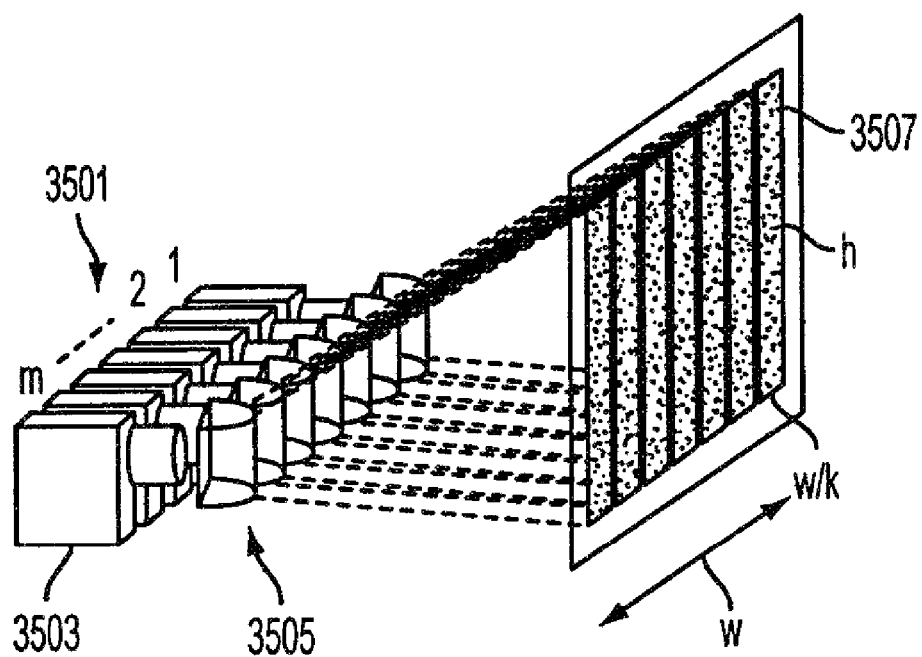
FIG. 35 is a perspective view of an array of anamorphic light engines in operation according to various embodiments of the present invention.

FIG. 35 illustrates a linear array of anamorphic light engines 3501 in operation. The anamorphic light engines 3501 are generally illustrated in FIG. 32. As shown, a group of m projectors 3503 are stacked closely together such that the compressed images 3507 they produce are tiled together without gaps to create a single image. The image produced has the same size as a normal image but the horizontal resolution is increased by a factor of k. For example, if the projectors have a resolution of 1024×768 pixels and produce a normal image of size 24 inches×18 inches, and the anamorphic lenses 3505 have a horizontal compression factor of 24, the image produced by the projectors would still have 1024×768 pixels but would be 1 inch×18 inches in size. 24 such projectors 3503 can therefore be stacked together to create a 24 inches×18 inches image with 24576×768 pixels. That is, each pixel would be 0.023 inches (595 microns) in height and 0.00097 inches (24.80 microns) in width.

Figure 36:
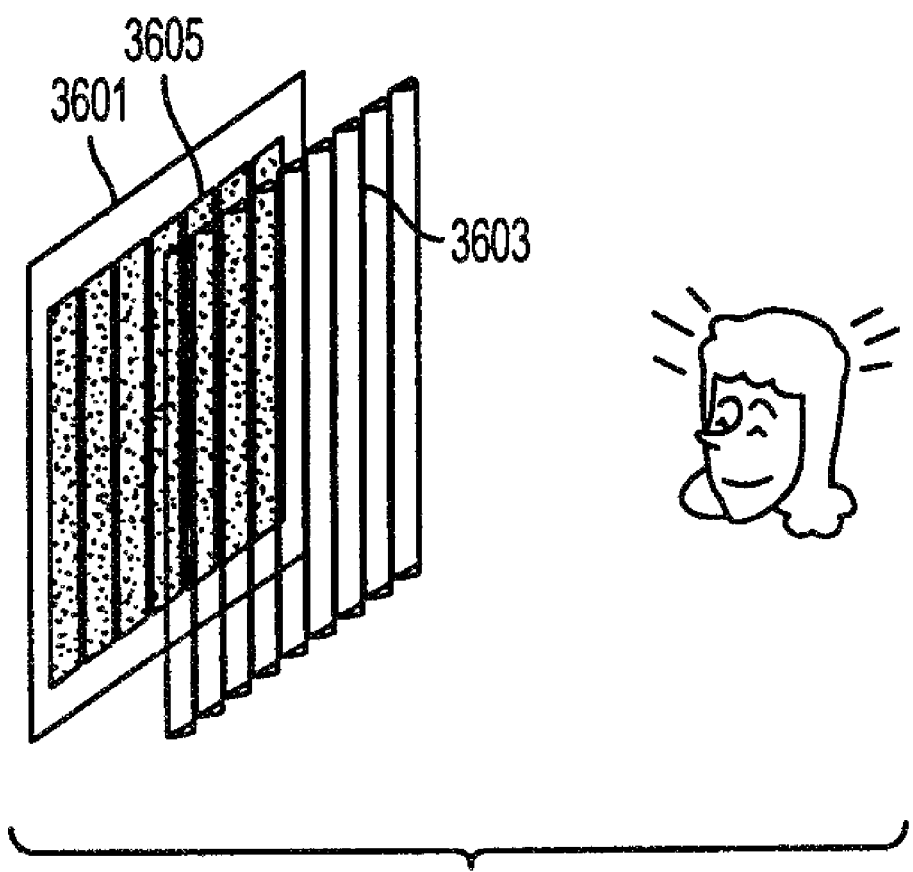
FIG. 36 is a perspective view of a portion of a 3D display system using anamorphic light engines according to various embodiments of the present invention.

Using the anamorphic light engine array 3501 illustrated in FIG. 35, 3D images can be displayed according to various embodiments of the present invention. FIG. 36 shows a diffusive screen 3601 and a lenticular lens array 3603, on which a tiled image 3605 is projected. Diffusive screen 3601 removes the directional property of the rays projected by the projectors (not shown). That is, when viewed from the side opposite from the projectors, the same high resolution image 3605 is seen but each pixel appears more or less equally bright from all viewing direction. The lenticular lens array 3603 is placed in front of the diffusive screen 3601 at such a position that the lenticular lenses 3603 are aligned with the vertical direction of the image 3605. Each lenticular lens is associated with a large number of image lines. For example, a lenticular lens array 3603 with 40 LPI (lenticules per inch) can be used where each lenticular lens has a viewing (divergence) angle of 30 degrees (+15 to −15 degrees). If 24 projectors (not shown), each with 1024×768 pixels are used to create a 24 inches×18 inches tiled image 3605, each lenticular lens on the array 3603 will include 1024/40=26.05 image lines. Because each lens has a horizontal field of view of 30 degrees, this would give us an angular resolution of approximately 1.15 degrees. Therefore, the images received by the left and right eyes of a viewer can be different (because at normal viewing distances, the eyes would be separate by more than 1.15 degrees), allowing the viewer to perceive the displayed scene in three dimensions. The viewer is also free to move around within the region bounded by the viewing angle of the lenticular lenses 3603.

Figure 37:
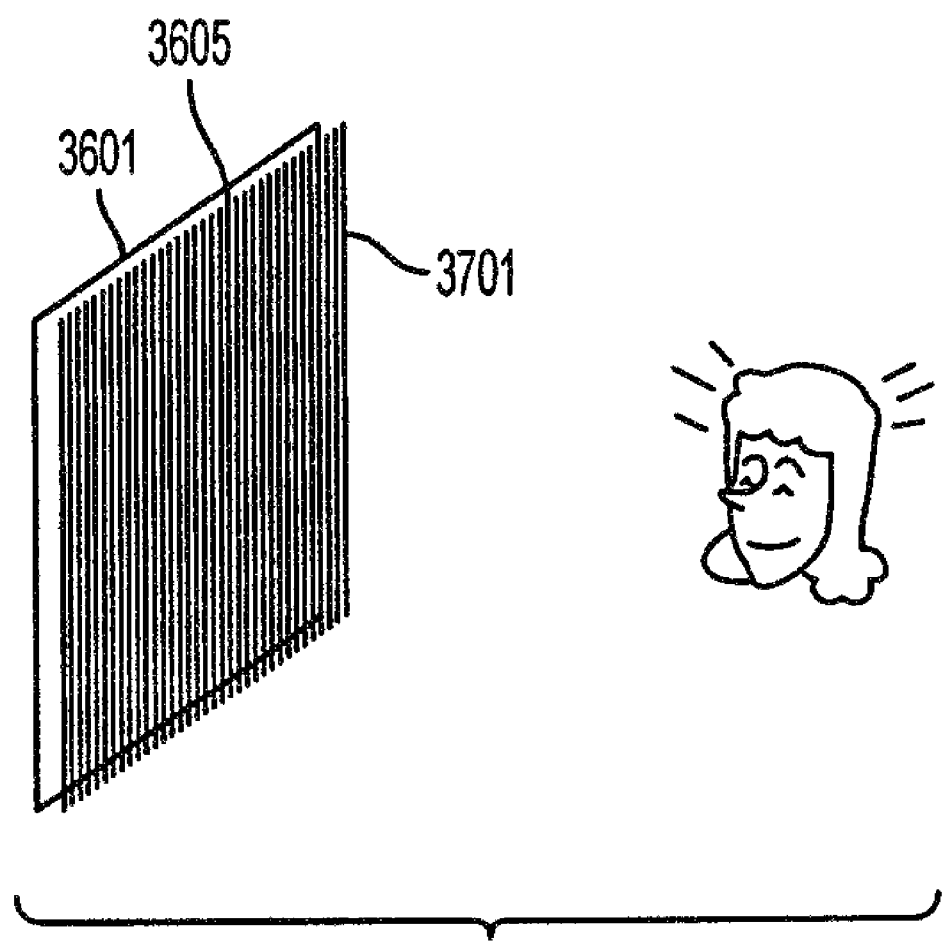
FIG. 37 is a perspective view of a portion of a 3D display system using anamorphic light engines according to various embodiments of the present invention.

FIG. 37 illustrates an alternative to the embodiment illustrated in FIG. 36. In this example, a parallax barrier array 3701, instead of a lenticular lens array 3603, is placed in front of the diffusive screen 3601. The effect created by a parallax barrier array 3701 is similar to the effect created by a lenticular lens array 3603. For example, a parallax barrier array 3701 with 40 vertical apertures (slits) per inch can be used where each parallax barrier has a viewing (divergence) angle of 30 degrees (+15 to −15 degrees). If 24 projectors (not shown), each with 1024×768 pixels are used to create a 24 inches×18 inches tiled image 3605, each parallax barrier on the array 3701 will include 1024/40=26.05 image lines. Because each parallax barrier has a horizontal field of view of 30 degrees, this would give us an angular resolution of approximately 1.15 degrees.

Figure 38:
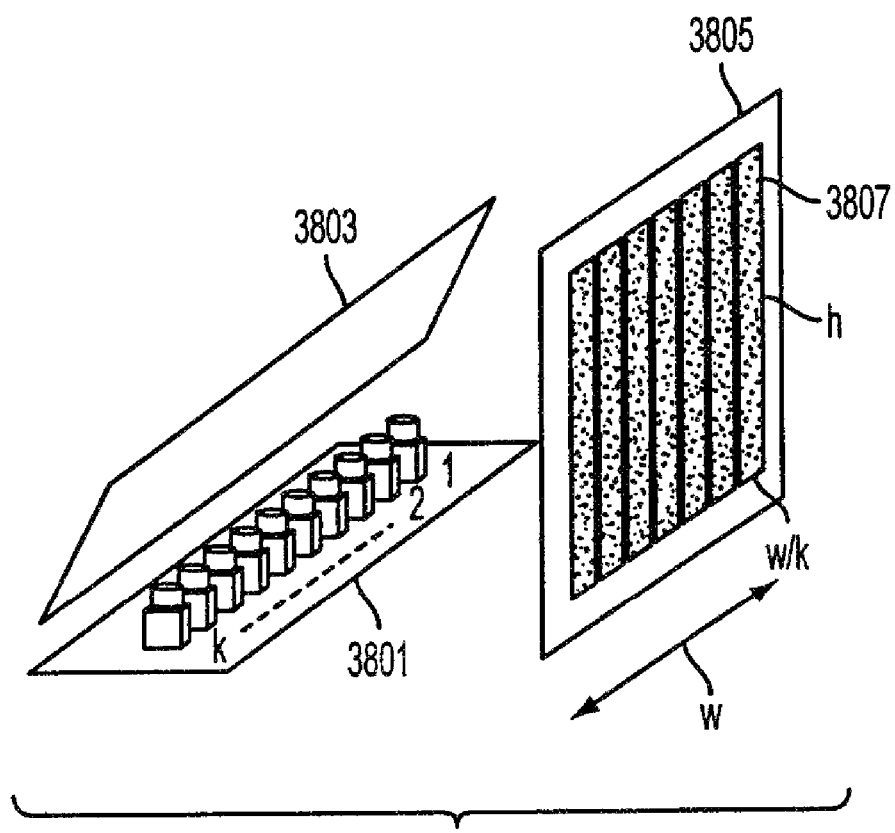
FIG. 38 is a perspective view of a compact 3D display system using anamorphic light engines according to various embodiments of the present invention.

FIG. 38 illustrates another embodiment of a 3D display system using anamorphic light engines. As shown, this embodiment is a compact rear projection display system. The system includes an array of compact anamorphic light engines 3801, each producing a 2D image. The light engines 3801 are compact in the sense that the system uses compact anamorphic lenses (not shown) to directly produce the compressed image 3807, rather than using an optical attachment to convert the perspective optics of a projector into an anamorphic one. To make the system more compact, a planar mirror 3803 may be used to fold the optical path between the light engines 3801 and the screen 3805 as shown.

Figure 39:
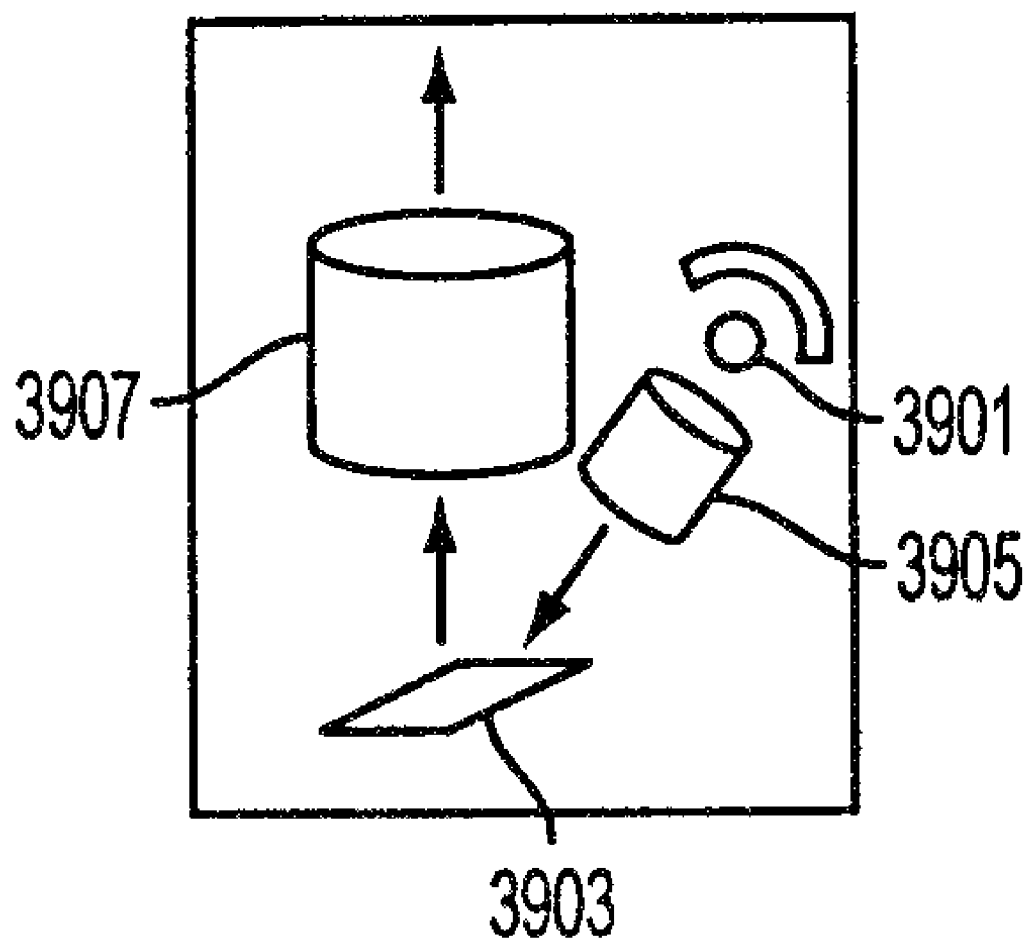
FIG. 39 is a diagram of a compact anamorphic light engine according to various embodiments of the present invention.

The light engines 3801 used in the system illustrated in FIG. 38 can be made from off-the-shelf components, as illustrated in FIG. 39. As shown, this engine can include a light source 3901, a digital micromirror device (DMD) 3903, a lens 3905 that collimates the light from the light source 3901 and focuses it onto the DMD 3903, and an anamorphic lens 3907. The DMD 3903 can be from Texas Instruments. The DMD 3903 modulates the incident light based on the input image and reflects the light. The reflected light can be projected onto the projection screen 3805 (shown in FIG. 38) using a custom-made anamorphic lens 3907. In some embodiments, a liquid crystal on silicon (LCOS) device can be used instead of the DMD. Again, in some embodiments, the light source 3901 can be a medium-powered LED. Alternatively, the light source 3901 can be a high-powered Xenon lamp of the type used in projectors.

Embodiments of systems generally illustrated in FIGS. 30-39 may also be used as high resolution projection systems for projecting 2D images. The enhanced resolution in one of the two dimensions of an image can be used to dramatically improve the perceived resolution of an image.

3D Display Systems Using Light Field Elements

According to various embodiments of the present invention, 3D display systems can use 2D light field elements to measure and create a four-dimensional (4D) light field. A light field is defined as a function that describes the amount of light traveling through every point in a region in every possible direction. A 2D light field, as used in this context, is a light field wherein the region only includes a single point. (This light field is referred to as a 2D light field because every light ray passing through a single point has two dimensions, in the sense that the ray can be represented by two angles with respect to the point.) A 4D light field, as used in this context, is a light field wherein the region is a 2D plane. (Again, this light field is referred to as a 4D light field because light rays passing through a single point have two dimensions, and the plane has two dimensions.) A light field element is defined in this context as a device that either measures or produces a 2D light field from a single point in space. A bi-directional light field element is defined in this context as a light field element that can simultaneously measure and produce a 2D light field from the point where the light field element is located. Light field elements can be arranged in a 2D array to measure and/or produce 4D light fields.

Because a 4D light field contains directional information of light rays at each point in a 2D plane, it can provide different images in different directions. As a result, the two eyes of a viewer can receive different 2D images from a 4D light field. Therefore, a 4D light field can be used to display a 3D scene for viewers around the light field.

Figure 40:
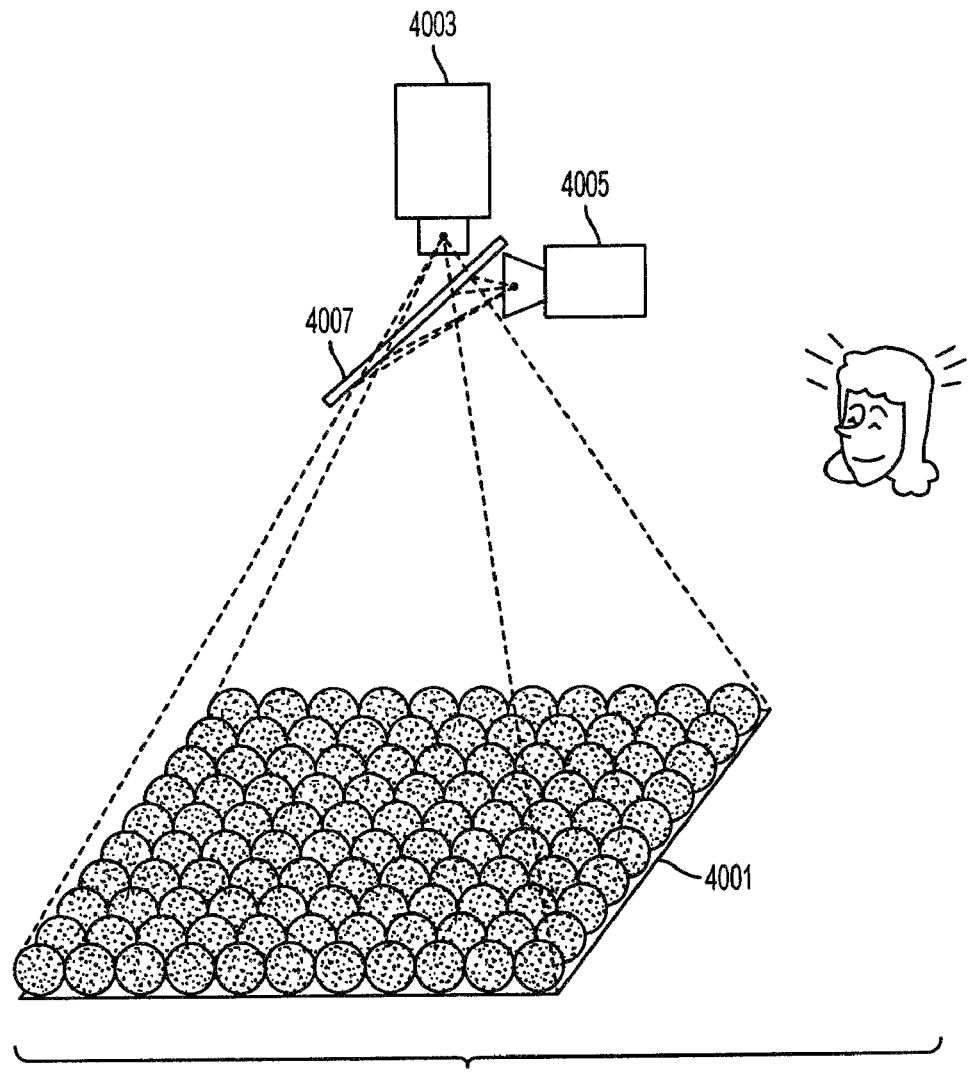
FIG. 40 is a perspective view of a 3D display system using light field elements according to various embodiments of the present invention.

FIG. 40 illustrates a 3D display system using light field elements. As shown, the system includes a 2D array of reflective spheres 4001, which can be curved reflectors (e.g., curved mirrors). In some embodiments, other shapes, such as paraboloidal, hyperboloidal, conical and ellipsoidal can be used instead of a sphere. A digital projector 4003 is used to project light rays onto the array of spheres 4001. A camera 4005 is used to capture the light rays reflected by the spheres 4001. Also shown, a half-mirror 4007 is located between the projector 4003 and the camera 4005. The projector 4003 and the camera 4005 are located in positions such that the projection centers of the projector 4003 and the camera 4005 are coincidental. Therefore, the rays that are used to project and the rays that are used to measure the 4D light field coincide.

The combination of the projector 4003, camera 4005, and each sphere is a single bi-directional light field element. This is because each sphere can reflect light rays from all directions in the space above the spheres 4001 to the camera 4005, so that almost the entire space above the spheres 4001 is captured (a small part of this space will be obstructed by neighboring spheres). Similarly, the projector image that is projected onto each sphere will determine the distribution of light reflected by the sphere. Therefore, each sphere is used to measure and produce a 2D light field, where the two dimensions are the angles of rays with respect to the center of the sphere.

Because a 2D array of spheres 4001 is included, the system is able to measure and produce a 4D light field. For example, the projector 4003 and the camera 4005 can have 1000×1000 pixels each and their fields of views can be focused on an array of 50×50 spheres 4001. Each sphere therefore corresponds to a 20×20 image in the camera 4005 and the projector 4003. More precisely, each sphere occupies a circular image having diameter of 20 pixels. This image of a single sphere captured by the camera 4005 can be used to determine the light incident upon the sphere from all directions with respect to the center of the sphere. The 4D light field is measured so that the system can be used to display a 3D scene together with the effect of the lighting environment upon the 3D scene. In some embodiments, a camera is not included, so the light field elements can only produce a 4D light field.

Figure 41:
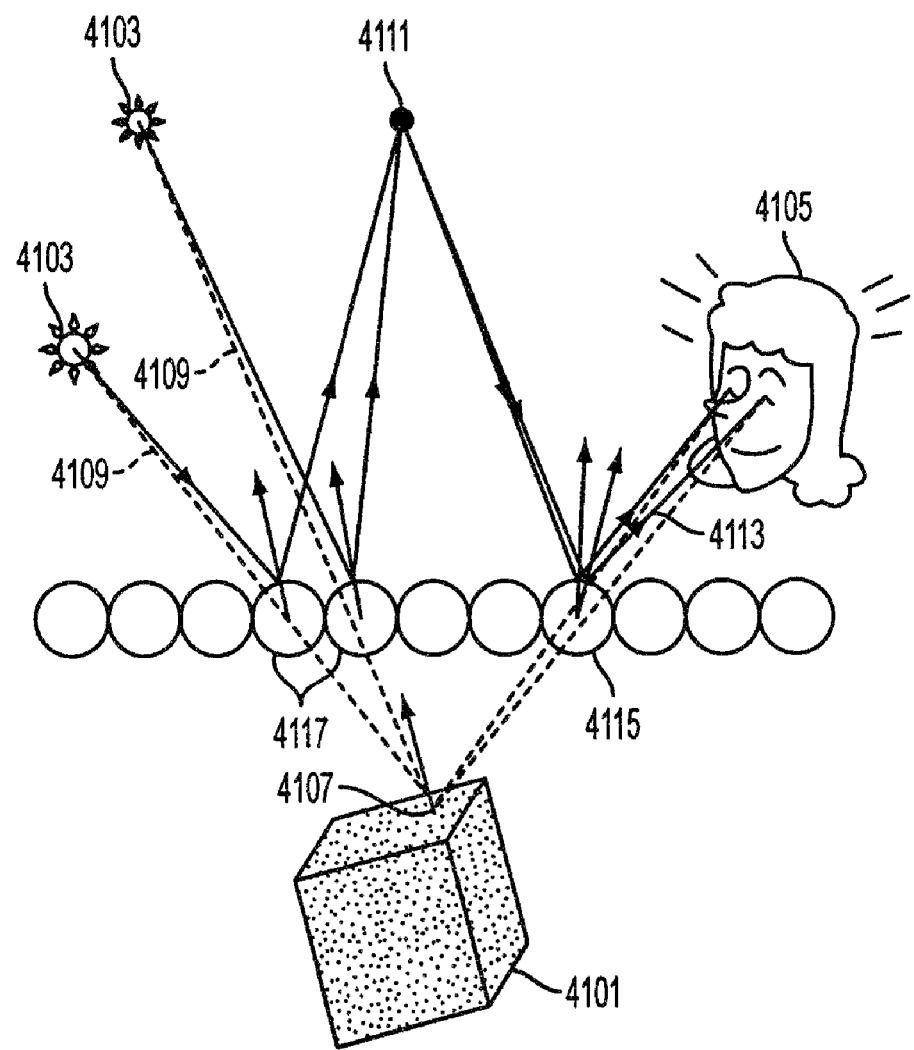
FIG. 41 is a diagram illustrating the operation of a 3D display system using light field elements according to various embodiments of the present invention.

FIG. 41 illustrates the operation of the system generally illustrated in FIG. 40. In this example, a 3D scene (in the shape of a cube) 4101 is being displayed by the system. In some embodiments, the 3D scene 4101 to be displayed can be computer-generated. Alternatively, the 3D scene can be based on captured images. Two light sources 4103 and a viewer 4105 are present in the environment. A point on the surface of the cube 4107 is shown. To show the effect of the light sources 4103 on the cube 4101, the system measures two light rays 4109 that would have (approximately) shone on the point

4107. These two light rays 4109 are reflected by two spheres 4117 into a camera 4111. Therefore, the locations and brightness of the light sources 4103 as seen by the point 4107 are measured. The brightness, colors and directions of the two rays 4109 can be used to compute the brightness and color of the point 4107 in the directions of the two eyes of the viewer 4105. This computation may take into account the reflectance properties of the cube's surface. As shown in the figure, the two rays 4113 that would be directed from the point 4107 towards the viewer's 4105 eyes can be produced by the projector, which is at the same location as camera 4111, by illuminating two points on another sphere 4115. This process of measuring light rays, computing, and projecting onto the sphere may be repeated (or performed simultaneously) for each point onto which the projector can project light. This process may also be performed continuously to account for changes in the light in the environment. The camera and the projector should be put in registration with respect to each other prior to performing this process using any suitable technique. In some embodiments, the camera may only need to observe a few or one of the spheres to measure the impact of the environment rather than observing all of the spheres. Also, in certain embodiments, the camera may be omitted and the image that is generated by the projector is created independently of the environment.

Figure 42:
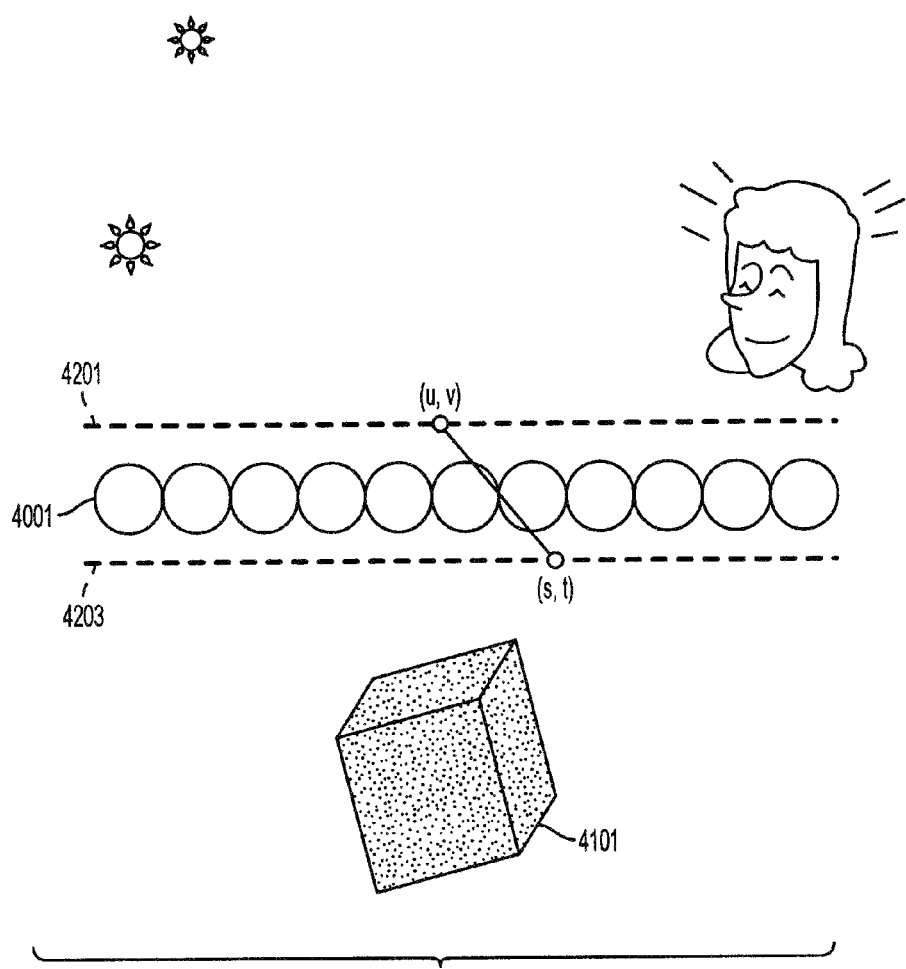
FIG. 42 is a diagram illustrating a representation of a 4D light field according to various embodiments of the present invention.

FIG. 42 can be used to illustrate more generally the technique described in FIG. 41. As shown, two parallel planes 4201, 4203 are placed on either side of the array of spheres 4001. A complete 4D light field can be represented using points on these two planes 4201, 4203. For example, if we denote points on the upper plane 4201 as (u, v) and points on the lower plane 4203 as (s,t), the incident 4D light field (which is the illumination of the environment) can be written as I(u,v,s,t) and the displayed light field (which is the 3D image being displayed) can be written as D(u,v,s,t). This is because for each point (u,v) on the upper plane 4201, every point (s,t) on the lower plane 4203 corresponds to a different direction of a ray passing through (u,v). The camera image of the spheres 4001 in camera 4111 gives us discrete samples of I(u, v, s, t). Each sample is obtained from a single sphere. These samples can be interpolated using standard light field interpolation methods and re-sampled to obtain a dense representation of the measured field I(u, v, s, t). Given an incident 4D light field, we can use the geometric and reflectance properties of a 3D scene 4101 to compute the desired display field D(u, v, s, t). This computation of the display field D(u, v, s, t) for any given incident field I(u, v, s, t) and any given scene is done using standard computer graphics rendering methods. The best discrete samples that would approximate the computed display field can be projected by a projector (not shown) onto the array of spheres 4001.

Figure 43:
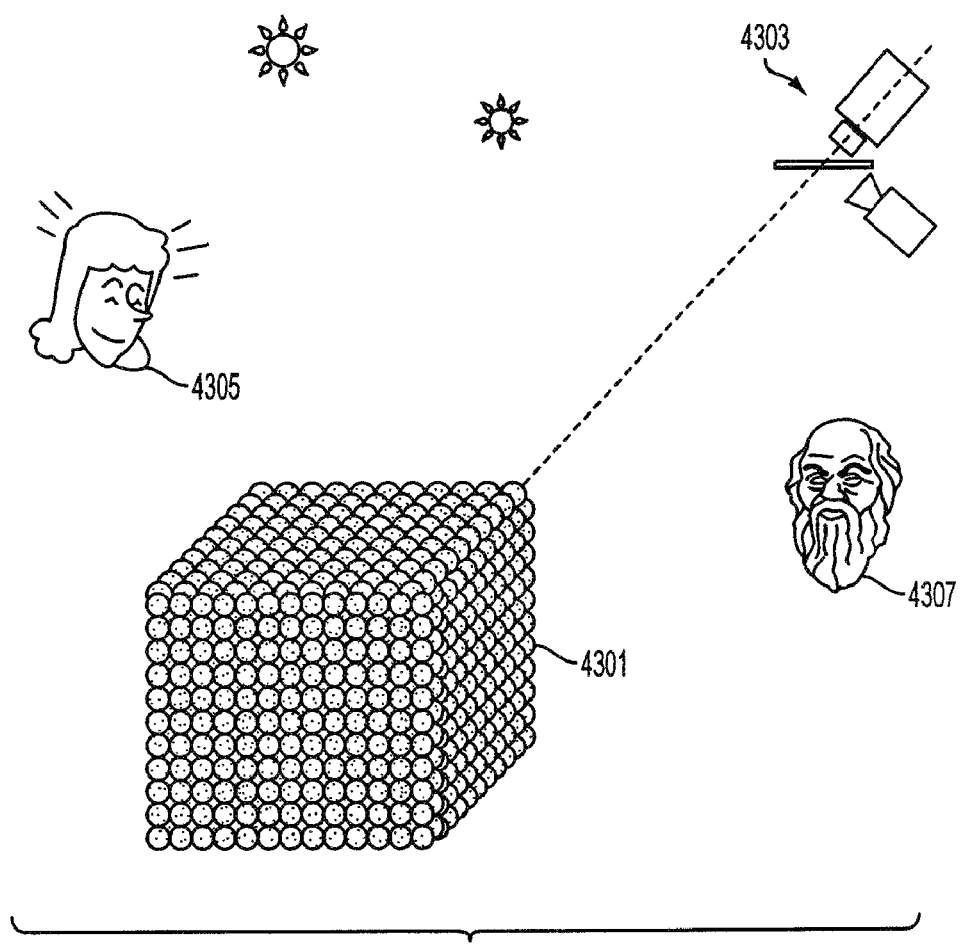
FIG. 43 is a perspective view of a 3D display system using light field elements according to various embodiments of the present invention.

FIG. 43 illustrates another embodiment of the present invention. In this embodiment, the light field elements include an array of spheres 4301 arranged on three faces of a cube. The entire array of spheres 4301 is measured and illuminated using a single projector-camera system 4303. Alternatively, multiple projector-camera systems can be used to increase the resolution of the measured and displayed light fields. The advantage of this system is that the viewers 4305, 4307 are free to move around the array of spheres 4301 and observe 3D scenes (not shown) from a larger range of viewing directions.

Figure 44:
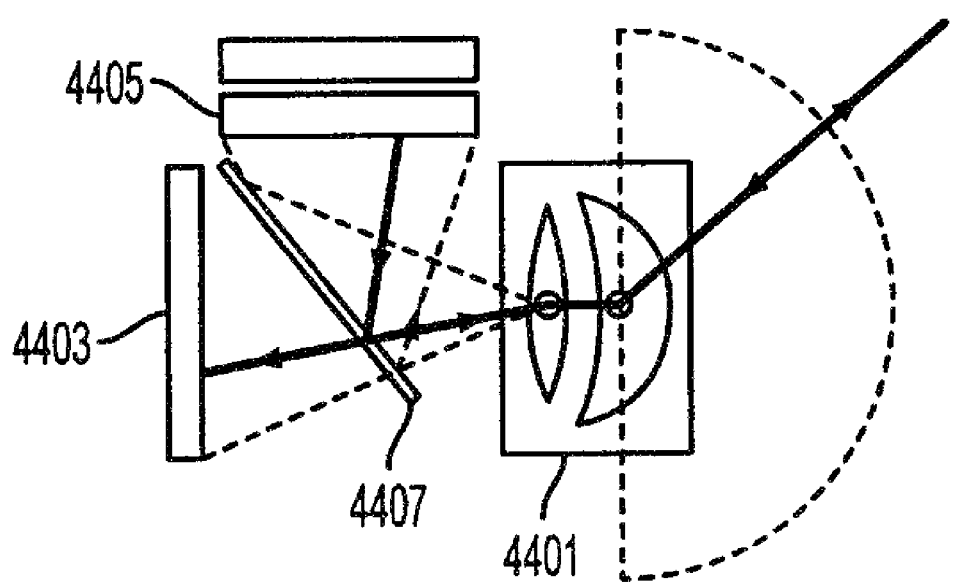
FIG. 44 is a cross-sectional view of a compact bi-directional light field element according to various embodiments of the present invention.

FIG. 44 illustrates a bi-directional light field element that is compact. As shown, the light field element includes a wide angle lens 4401, an image detector 4403, a LCD display 4405 and a half-mirror 4407. The wide-angle lens 4401 creates images on the image detector 4403 and projects images from the LCD display 4405 at the same time. In this example, the half-mirror 4407 is used behind the lens 4401 so that the lens 4401 can be shared by the detector 4403 and the display 4405.

Figure 45:
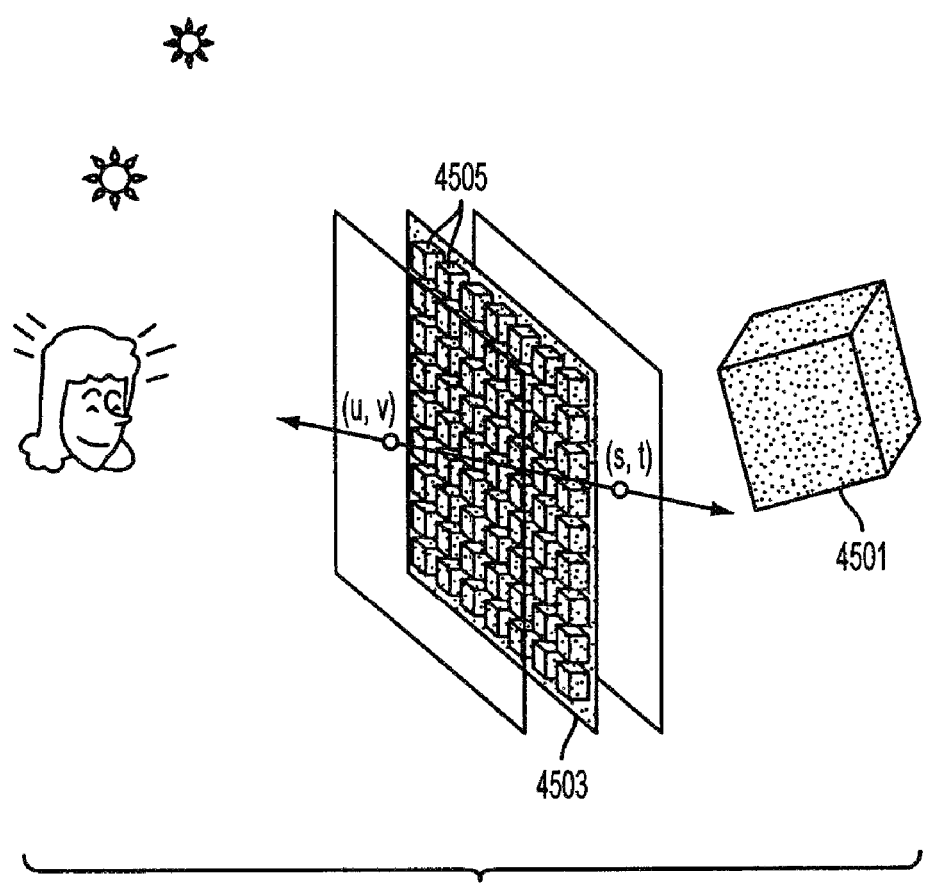
FIG. 45 is a perspective view of a 3D display system using a 2D array of bi-directional light field elements illustrated in FIG. 44 according to various embodiments of the present invention.

FIG. 45 illustrates a 3D display system using a large array of bi-directional light field elements 4505 illustrated in FIG. 44. The light field elements 4505 are located on a plane 4503. This system can measure the 4D light field falling on it as well as display a 4D light field. The displayed light field enables multiple viewers to experience a displayed 3D scene 4501. In addition, the measured light field can be used to accordingly change the appearance of the displayed scene 4501.

Figure 46:
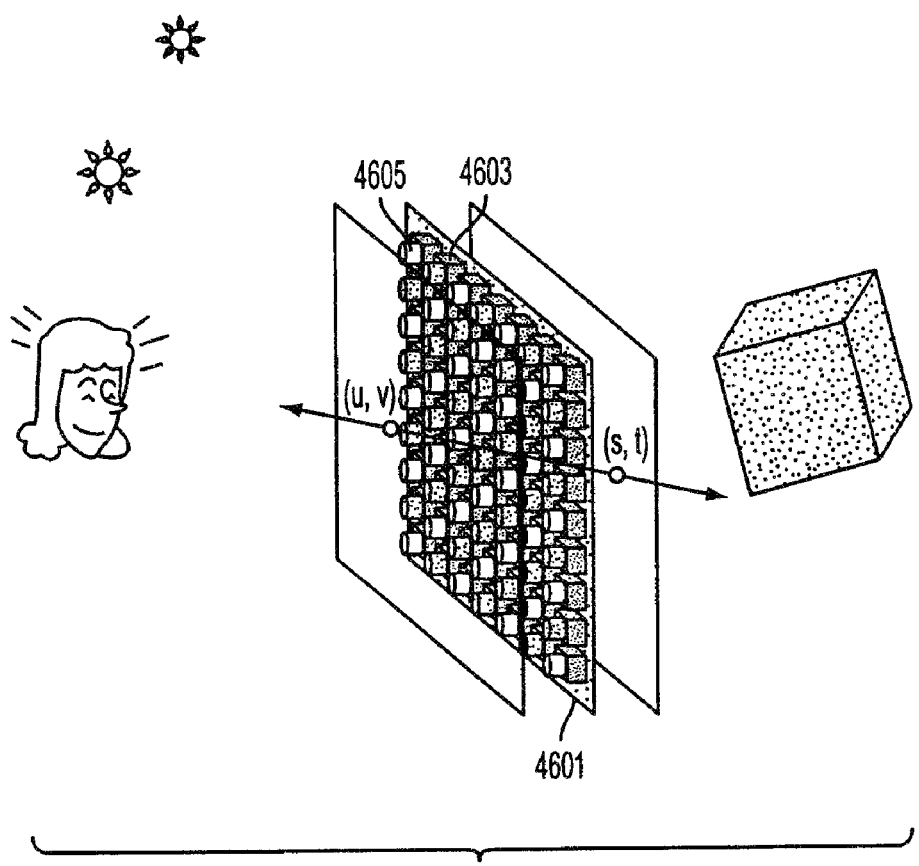
FIG. 46 is a perspective view of a 3D display system using unidirectional light field elements according to various embodiments of the present invention.

FIG. 46 illustrates a 3D display system using unidirectional light field elements. Each element at any given location can only measure or display a 2D light field. Elements that measure a 2D light field (one of which is shown as 4603) and elements that produce a 2D light field (one of which is shown as 4605) may alternately be located in a plane 4601. This system can be used on large display systems (e.g., electronic billboards), in which case resolution is less of an issue. Although the spatial sampling of both the measured and displayed fields is more coarse in this case, it is sufficient for viewing from a large distance.

Figure 47:
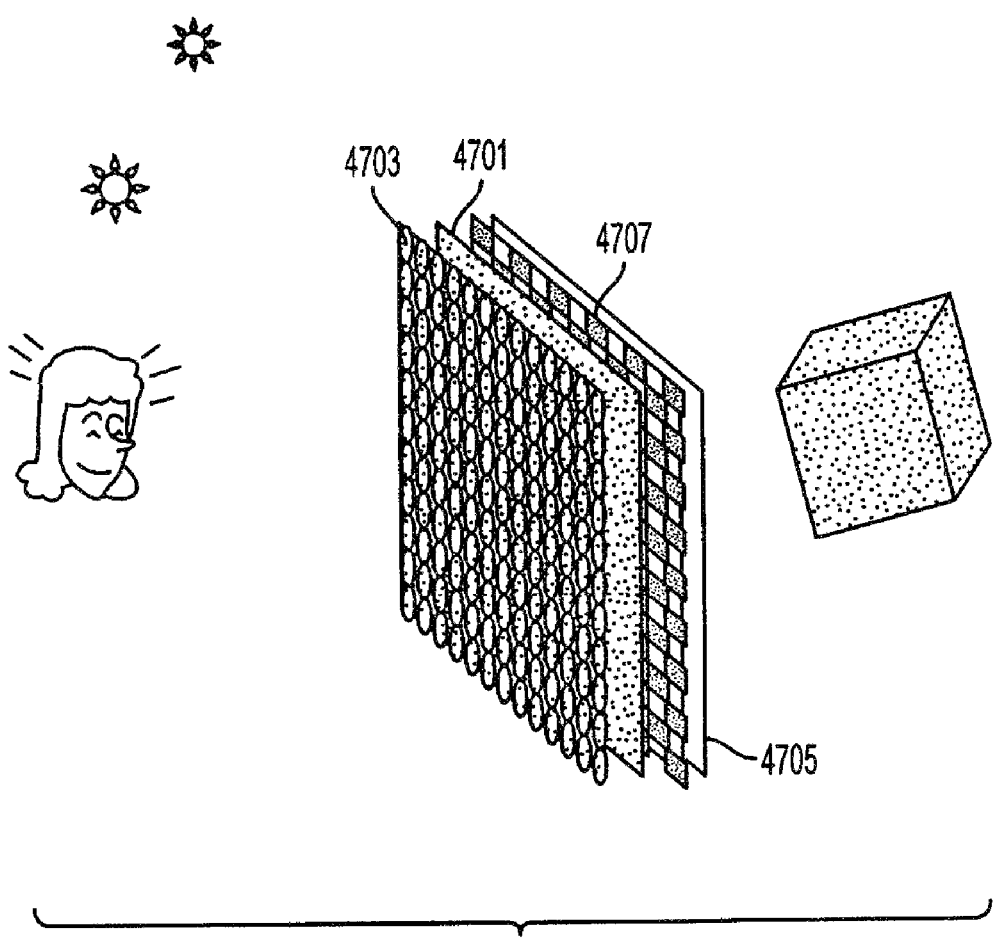
FIG. 47 is a perspective view of another 3D display system using light field elements according to various embodiments of the present invention.

FIG. 47 illustrates another system using light field elements. In this system, a single LCD panel 4701 is used to generate the displayed light field. An array of image detectors 4707 is used to measure the incident field. A backlight 4705 is used to illuminate the LCD panel 4701. The detectors 4707 are placed between the backlight 4705 and the LCD panel 4701. As shown in the figure, the detectors 4707 are placed in a checkerboard fashion such that the spaces not occupied by the detectors 4707 are used to produce displayed light fields. In the areas occupied by the detectors 4707, the LCD is inactive or simply used as an attenuator for the detectors 4707, which can be useful when the lighting in the environment is too bright for the detectors 4707 to measure within their dynamic range. In front of the LCD panel 4701 is a lenslet array 4703 (i.e., an array of small lenses). A lens in the array 4703 that lies in front of a detector is used to form the detector image. A lens in the array 4703 that does not lie in front of a detector is used to project the light field displayed on the LCD elements just behind the lens. The lenses of the array 4703 have a reasonably large field of view, so that the system can measure illumination incident from a wide range of directions, and the viewers can view the displayed scene from a large range of viewing angles.

Figure 48:
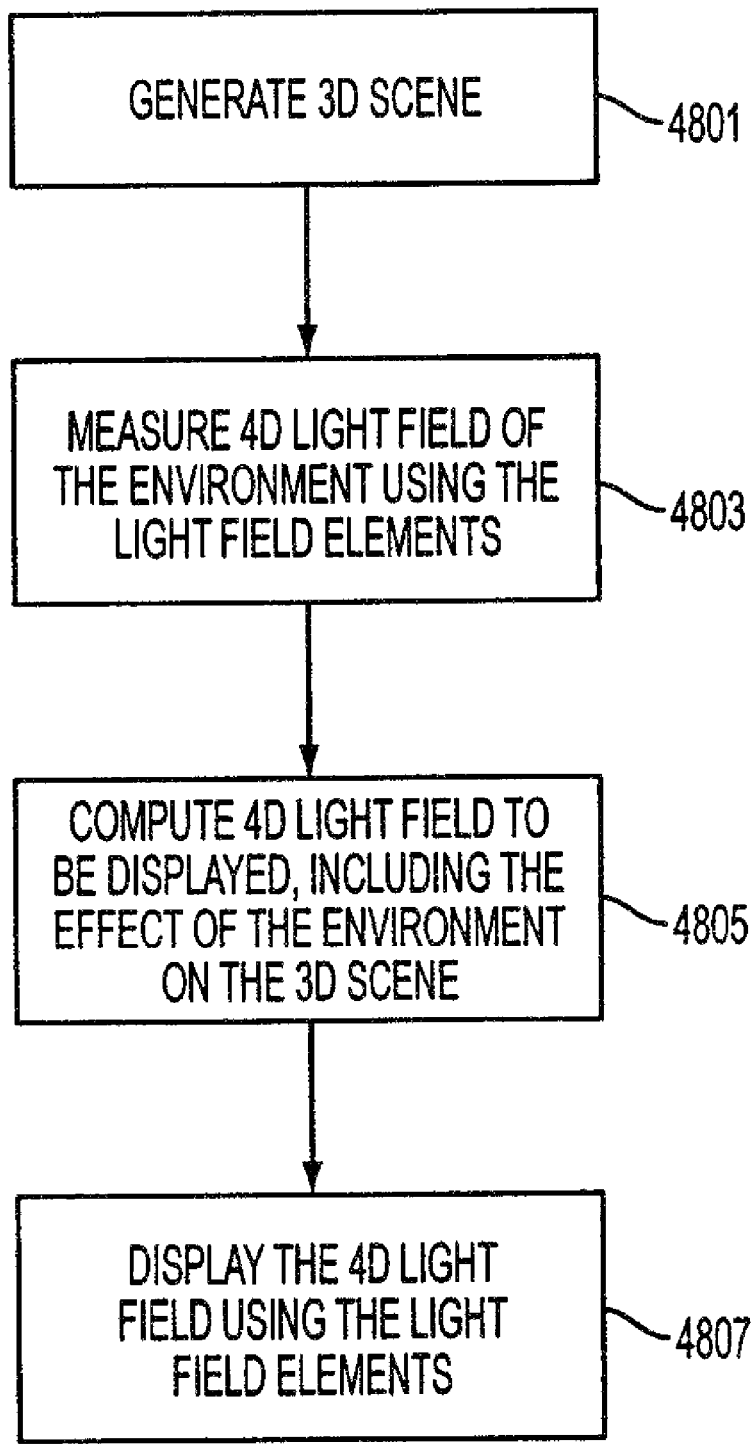
FIG. 48 is a flow chart illustrating the steps for display 3D scenes using a system illustrated in FIG. 40 according to various embodiments of the present invention.

FIG. 48 is a flow chart illustrating the steps for displaying 3D scenes together with the effect of the environment on the scenes, using a system illustrated in FIG. 40. As shown, the first step 4801 is to generate a 3D scene using any suitable methods. The second step 4803 is to measure the 4D light field of the environment using the light field elements. The third step 4805 is to compute the 4D light field to be displayed by combining the generated 3D scene and the measured 4D light field of the environment. The last step 4807 is to display the 4D light field using the light field elements. This process may loop back to step 4801 to account for changing scenes or step 4803 to account for changing environments.

Other embodiments, extensions, and modifications of the ideas presented above are comprehended and within the reach of one skilled in the art upon reviewing the present disclosure. Accordingly, the scope of the present invention in its various aspects should not be limited by the examples and embodiments presented above. The individual aspects of the present invention, and the entirety of the invention should be regarded so as to allow for modifications and future developments within the scope of the present disclosure. The present invention is limited only by the claims that follow.

The invention claimed is:

1. A system for displaying three-dimensional (3D) images, the system comprising:
a display block made from a transparent material with optical elements three-dimensionally disposed therein, wherein each optical element becomes luminous when illuminated by a light ray, and wherein the optical elements are arranged to form a shape similar to a face;
a computer configured to generate a two-dimensional (2D) image formatted to create a 3D image when projected on the display block; and
a projector coupled to the computing device and configured to project the 2D image on the block to create the 3D image by causing a set of the passive optical elements to become luminous.

2. The system of claim 1, wherein the 2D image projected is a face image.

3. The system of claim 2, wherein the face image and the face are generated from the same face.

4. The system of claim 1, wherein the 2D image projected as the face is animated.

5. The system of claim 1, further comprising a user input device, wherein the computer is configured to receive input from the user input device and generate 2D images based on, in part, the input.

6. The system of claim 5, wherein the 2D image projected as the face is animated in response to the input.

7. The system of claim 1, wherein the projector is video projector.

8. The system of claim 1, wherein the projector is an LCD display.

9. A method for displaying three-dimensional (3D) images, the method comprising:
receiving contour data corresponding to a face;
forming a surface in a display block made from a transparent material with optical elements three-dimensionally disposed therein by arranging the optical elements to form the surface to approximate the contour data corresponding to the face, wherein each optical element becomes luminous when illuminated by a light ray;
generating a two-dimensional (2D) image formatted to create a 3D image when projected on the display block; and
projecting the 2D image on the display block to create the 3D image by causing a plurality of the optical elements to become luminous.

10. The method of claim 9, further comprising capturing a 2D video containing movement data corresponding to the face.

11. The method of claim 10, further comprising registering a frame from the 2D video with the surface in the display block.

12. The method of claim 11, further comprising selecting a plurality of points from the frame and corresponding the plurality of points with the optical elements that form the surface.

13. The method of claim 9, further comprising providing audio data that corresponds to the movement data.

14. The method of claim 9, further comprising receiving input from a user input device and generating 2D images based at least in part on the received input.

15. A system for displaying three-dimensional (3D) images, the system comprising:
means for capturing contour data corresponding to a face;
means for forming a surface in a display block made from a transparent material with optical elements three-dimensionally disposed therein by arranging the optical elements to form the surface to approximate the contour data corresponding to the face, wherein each optical element becomes luminous when illuminated by a light ray;
means for generating a two-dimensional (2D) image formatted to create a 3D image when projected on the display block; and
means for projecting the 2D image on the display block to create the 3D image by causing a plurality of the optical elements to become luminous.

16. The system of claim 15, further comprising. means for capturing a 2D video containing movement data corresponding to the face.

17. The system of claim 16, further comprising means for registering a frame from the 2D video with the surface in the display block.

18. The system of claim 17, further comprising means for selecting a plurality of points from the frame and means for corresponding the plurality of points with the optical elements that form the surface.

19. The system of claim 15, further comprising means for providing audio data that corresponds to the movement data.

20. The system of claim 15, further comprising means for receiving input and means for generating 2D images based at least in part on the received input.

* * * * *